United States Patent
Al-Shalash

(10) Patent No.: US 9,538,450 B2
(45) Date of Patent: Jan. 3, 2017

(54) SYSTEM AND METHOD FOR MOBILE RELAY PACKET GATEWAY RELOCATION FOR PATH OPTIMIZATION

(71) Applicant: FutureWei Technologies, Inc., Plano, TX (US)

(72) Inventor: Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 236 days.

(21) Appl. No.: 13/958,380

(22) Filed: Aug. 2, 2013

(65) Prior Publication Data

US 2014/0036776 A1   Feb. 6, 2014

Related U.S. Application Data

(60) Provisional application No. 61/679,638, filed on Aug. 3, 2012.

(51) Int. Cl.
*H04W 4/00* (2009.01)
*H04W 40/22* (2009.01)
(Continued)

(52) U.S. Cl.
CPC ......... *H04W 40/22* (2013.01); *H04W 36/0033* (2013.01); *H04W 84/005* (2013.01); *H04W 84/047* (2013.01)

(58) Field of Classification Search
CPC .................................................. H04W 40/22
See application file for complete search history.

(56) References Cited

U.S. PATENT DOCUMENTS 7,424,295 B2 * 9/2008 Isobe ...................... H04L 45/00
                                                             370/331
8,588,784 B2 * 11/2013 Kato ..................... H04L 1/1874
                                                             370/331
(Continued)

FOREIGN PATENT DOCUMENTS

WO   WO 2013044979 A1 *  4/2013

OTHER PUBLICATIONS

3GPP TS 36.300 V11.6.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 11)", Jun. 2013, 209 pages.

(Continued)

*Primary Examiner* — Guang Li
(74) *Attorney, Agent, or Firm* — Slater Matsil, LLP

(57) ABSTRACT

A bearer path can be optimized following a mobile relay node (MRN) handover in order to directly re-route the bearer path from a user equipment (UE) core network to a target donor base station (DeNB). Bearer path optimization signaling includes a packet data network gateway (PGW) relocation information element (IE) indicating that a PGW of an MRN is being relocated from an initial DeNB to a target DeNB. The PGW relocation IE may be carried in a path switch request message. Bearer path optimization signaling also includes an non-access stratum (NAS) activate default enhanced packet switch (EPS) bearer context request/accept messages for activating the optimized bearer path. The NAS activate default EPS bearer request/accept messages may be communicated between the mobile relay node mobility management entity (MME) and the MRN via the target DeNB.

21 Claims, 21 Drawing Sheets

(51) Int. Cl.
*H04W 36/00* (2009.01)
*H04W 84/00* (2009.01)
*H04W 84/04* (2009.01)

(56) References Cited

U.S. PATENT DOCUMENTS

| | | | | |
|---|---|---|---|---|
| 8,954,078 | B2* | 2/2015 | Van Phan | H04W 36/08 370/335 |
| 9,088,922 | B2* | 7/2015 | Lu | H04W 36/08 |
| 9,179,376 | B2* | 11/2015 | Wang | H04W 36/0055 |
| 2008/0084819 | A1* | 4/2008 | Parizhsky | H04L 47/10 370/230 |
| 2009/0185492 | A1* | 7/2009 | Senarath | H04B 7/155 370/238 |
| 2009/0252134 | A1* | 10/2009 | Schlicht | H04L 1/0015 370/338 |
| 2010/0142447 | A1* | 6/2010 | Schlicht | H04W 4/20 370/328 |
| 2011/0274276 | A1* | 11/2011 | Xu | H04W 12/04 380/272 |
| 2012/0071085 | A1* | 3/2012 | Gunnarsson et al. | 455/7 |
| 2012/0140700 | A1* | 6/2012 | Huang | H04W 36/12 370/315 |
| 2012/0250602 | A1* | 10/2012 | Ou et al. | 370/315 |
| 2012/0252355 | A1* | 10/2012 | Huang et al. | 455/7 |
| 2012/0294276 | A1* | 11/2012 | Jaiswal | H04W 36/023 370/331 |
| 2012/0315916 | A1* | 12/2012 | Van Phan | H04W 36/08 455/442 |
| 2012/0320817 | A1* | 12/2012 | Xu et al. | 370/315 |
| 2013/0089022 | A1* | 4/2013 | Lu et al. | 370/315 |
| 2013/0183971 | A1* | 7/2013 | Tamaki et al. | 455/436 |
| 2013/0215820 | A1* | 8/2013 | Redana et al. | 370/315 |
| 2014/0086138 | A1* | 3/2014 | Teyeb et al. | 370/315 |
| 2014/0328246 | A1* | 11/2014 | Xu et al. | 370/315 |

OTHER PUBLICATIONS

3GPP TR 36.806 V9.0.0, "3$^{rd}$ Generation Partnership Project; Technical Specification Group Radio Access Network; Evolved Universal Terrestrial Radio Access (E-UTRA); Relay architectures for E-UTRA (LTE-Advanced) (Release 9)", Mar. 2010, 34 pages.

3GPP TR 36.836 V2.0.1, 3$^{rd}$ Generation Partnership Project; Technical Specification Group Radio Access Network; Mobile Relay for Evolved Universal Terrestrial Radio Access (E-UTRA) (LTE-Advanced); (Release 12), Oct. 2012, 35 pages.

"Path Optimization for Mobile Relay," 3GPP TSG RAN WG3 Meeting #75bis, R3-120610, Document for Discussion and Approval, Nokia Siemens Networks, ZTE, NEC, San Jose del Cabo, Mexico, Mar. 26-30, 2012.

"Discussion and Comparison on Path Optimization for Mobile Relay Alternatives," 3GPP TSG RAN WG3 Meeting #76, Prague, R3-121118, Document for Discussion and Decision, New Postcom, Institute for Information Industry (III), Czech Republic, May 21-25, 2012.

"Mobile Relay PGW Relocation for Path Optimization," 3GPP TSG RAN WG3 Meeting #77, R3-121656, Document for Discussion and Decision, Huawei, Qingdao, CN, Aug. 13-17, 2012.

* cited by examiner

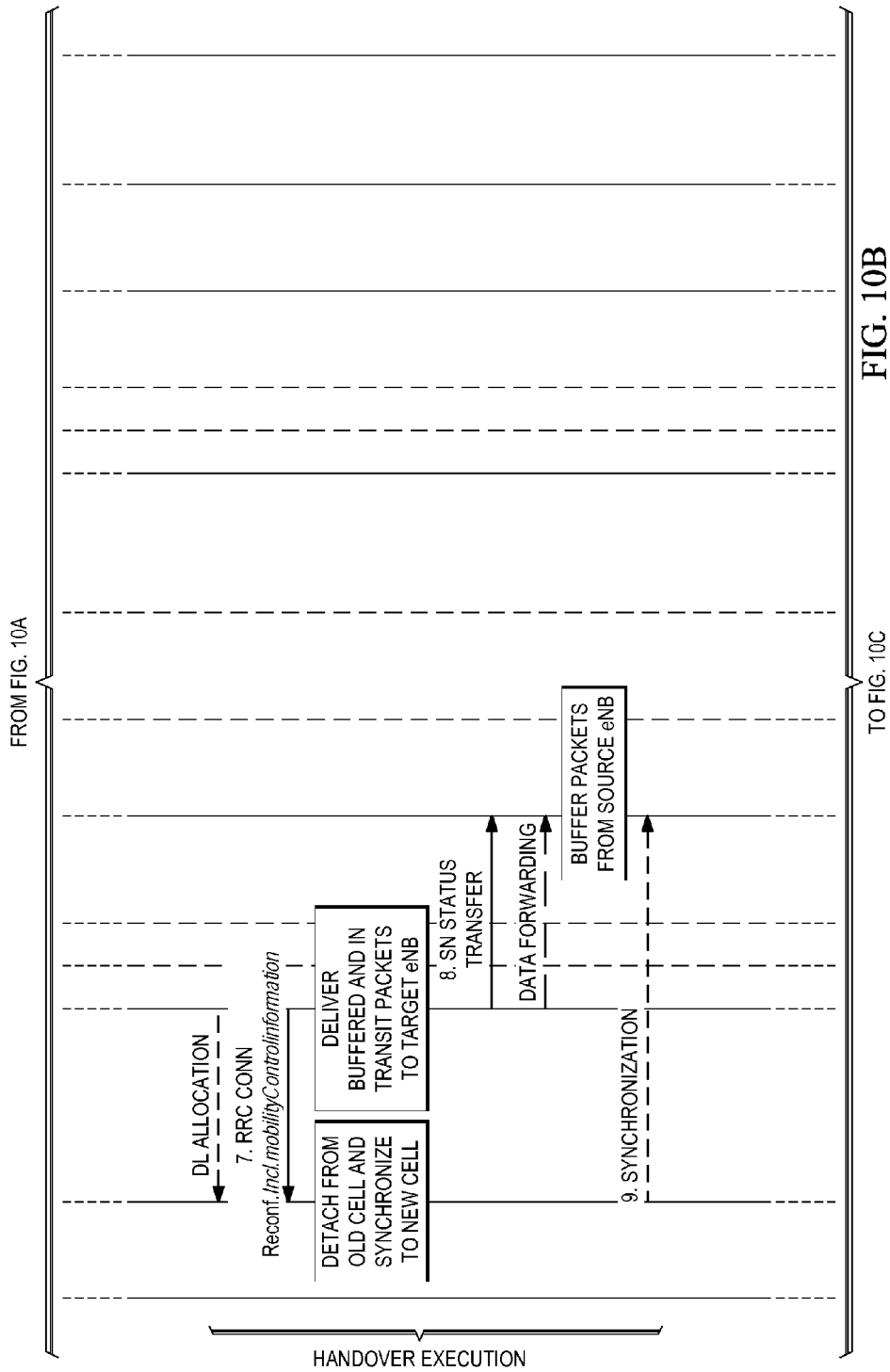

SYSTEM AND METHOD FOR MOBILE RELAY PACKET GATEWAY RELOCATION FOR PATH OPTIMIZATION

This application claims the benefit of U.S. Provisional Application No. 61/679,638 filed on Aug. 3, 2012, entitled "System and Method for Mobile Relay Packet Gateway Relocation for Path Optimization," which is incorporated herein by reference as if reproduced in its entirety.

TECHNICAL FIELD

The present invention relates to a system and method for wireless communications, and, in particular embodiments, to a system and method for providing mobile relay packet gateway relocation for path optimization.

BACKGROUND

In next generation long term evolution (LTE) networks, mobile relay nodes (MRNs) will provide wireless coverage to users equipments (UEs) on public transportation vehicles, e.g., buses, trains, etc. Deployment of MRNs may allow for consolidated handovers of multiple UEs, as well as a lower incidence of dropped calls and reduced interference to surrounding mobile devices. Accordingly, techniques and mechanisms for integrating MRNs into communications protocols are desired.

SUMMARY OF THE INVENTION

Technical advantages are generally achieved, by embodiments of this disclosure which describe systems and methods for providing mobile relay packet gateway relocation for path optimization.

In accordance with an embodiment, a method for path optimization in a mobile relay node architecture is provided. In this example, the method comprises communicating traffic flows over a first bearer path extending between a mobile relay node and a core network of a user equipment (UE). The first bearer path extends through both an initial donor enhanced base station (DeNB) and a target DeNB. The mobile relay node provides wireless access to the UE. The method further includes coordinating a transfer of the traffic flows from the first bearer path to a second bearer path extending from the core network to the mobile relay node. The second bearer path passes through the target DeNB without passing through the initial DeNB. As apparatus for performing this method is also provided.

In accordance with another embodiment, a method for path optimization in a mobile relay node architecture is provided. In this example, the method includes receiving a path switch request message for initiating a path optimization of a bearer channel carrying traffic between a core network and a user equipment (UE). The mobile relay node provides wireless access to the UE. The bearer channel extends over a first bearer path prior to optimization, with the first bearer path passing through both an initial donor enhanced base station (DeNB) and a target DeNB. The method further includes sending a create session path request to the target DeNB. The create session path request initiates the establishment of a second bearer path that passes through the target DeNB without passing the initial DeNB. The method further includes sending an activate default enhanced packet switch (EPS) bearer context request message to the target DeNB to coordinate a transfer of the bearer channel from the first bearer path to the second bearer path. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 10A-10E illustrates a protocol diagram of an embodiment messaging sequence for PGW relocation;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
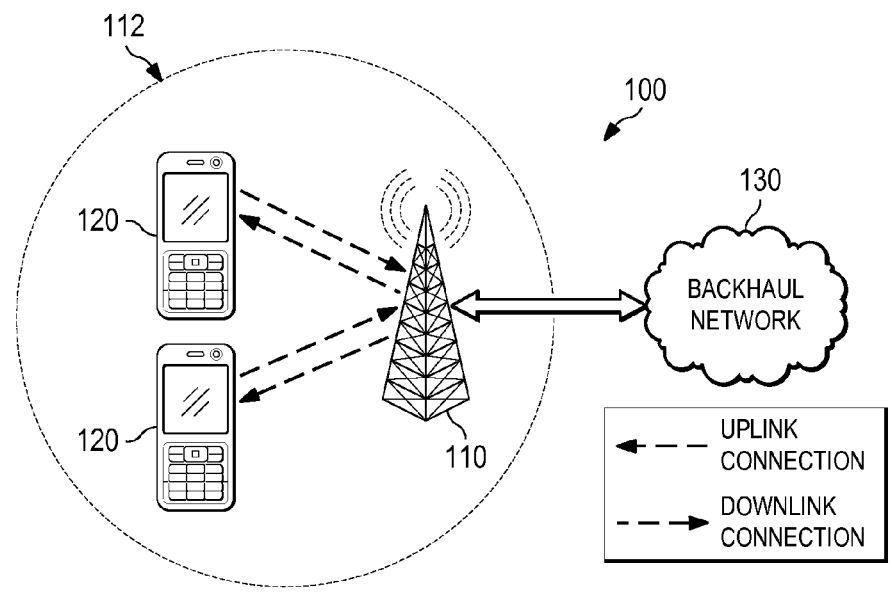
FIG. 1 illustrates a diagram of a wireless network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As used herein, the term "UE bearer" refers to a bearer channel that carries packet data between a UE and core network CN serving that UE during a communication session, while the term "bearer path" will be used to refer to a pathway that a UE bearer traverses between the CN and the MRN. Hence, a UE bearer will be transferred from one bearer path to another in the event of a handover or optimization.

In mobile relay architectures, bearer paths typically traverse multiple backhaul interfaces, including a UE S1 interface between a core network of the UE and a mobile relay packet data network gateway (MRN PGW), an S5/S8 bearer interface between the MRN PGW and a mobile relay serving gateway (MRN SGW), and an S1 bearer interface between the MRN SGW and the eNB serving the MRN, a network side radio interface (Un interface) between the eNB and the MRN. The MRN PGW, MRN SGW, and eNB are typically components of a donor base station (DeNB), which may be located at a cell tower or some other wireless access point (AP). Mobility of the MRN may require a mobility management entity (MRN MME) to manage and process signaling between the initial DeNB and target DeNB, during handover events. During conventional MRN handovers, the bearer path is modified by re-routing the S5/S8 bearer (or S1 bearer) from a MRN PGW (or MRN SGW) in the initial DeNB to a MRN SGW (or eNB) in the target DeNB. Hence, the bearer path continues to extend through the initial/source DeNB after the conventional MRN handover is complete. After several such MRN handovers, the length of the physical path between the initial DeNB and the target DeNB can become very large. For example, if the MRN is mounted in a vehicle such as a train, during the course of the train's journey, the MRN may travel across country, or even traverse international borders. Data may need to be routed to an initial DeNB, which may be in another city or geographical area, and then back again to the target DeNB. This non-optimal routing may introduce significant delay, which may negatively impact the quality of service QoS. Furthermore, the initial DeNB may no longer be reachable for the target DeNB, if it is located in the network of another operator, or another section of the same operator's network. As such, techniques for bearer path optimization in mobile relay architectures are needed.

Aspects of this disclosure provide bearer path optimization techniques for re-routing the bearer path directly from the UE's core network to the target DeNB following an MRN handover. More specifically, the bearer path optimization techniques provide signaling for creation of the optimized bearer path, as well as signaling to coordinate the transfer of UE bearers from the previous bearer path to the optimized bearer path. In one example, the signaling includes a PGW relocation information element (IE) indicating that a PGW of an MRN is being relocated from an initial DeNB to a target DeNB. The PGW relocation IE may be carried in a path switch request message. In another example, the signaling includes an non-access stratum (NAS) activate default enhanced packet switch (EPS) bearer context request/accept messages for activating the optimized bearer path. The NAS activate default EPS bearer request/accept messages may be communicated between the MRN MME and the MRN via the target DeNB. The activate default EPS bearer request/accept messages may be communicated between the MRN and the target DeNB over the Un interface, by encapsulation within radio resource control (RRC) signaling, such as a RRC connection reconfiguration message.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
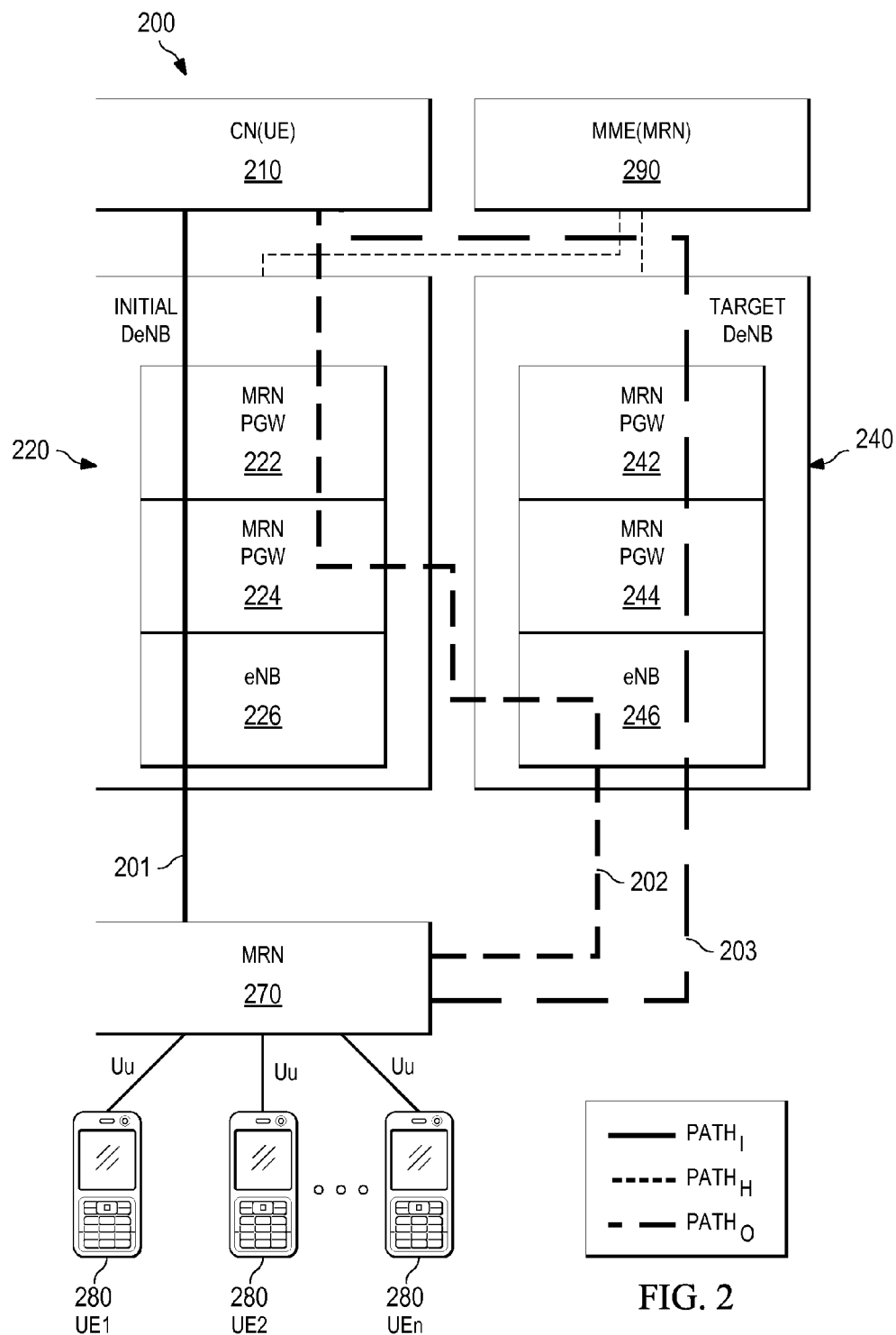
FIG. 2 illustrates a diagram of bearer paths in a mobile relay network architecture.

Aspects of this disclosure provide techniques for path optimization in a mobile relay network. FIG. 2 illustrates the various bearer paths in a mobile relay network 200, before handover, following handover and following path optimization. The mobile relay network 200 includes a UE core network (UE CN) 210, an initial DeNB 220, a target DeNB 240, an MRN 270, and a plurality of UEs 280. The mobile relay network 200 may also include a mobile relay node mobility management entity (MRN MME) 290, which may be coupled to the DeNBs, 220, 240 via a control plane. The UE core network may comprise a mobility management entity (UE MME), a serving gateway (UE SGW), a packet gateway (UE PGW). The DeNBs 220, 240 may be wireless access points (APs), with the initial DeNB 220 including a PGW 222, an SGW 224, and an eNB 226, and the target DeNB 240 including a PGW 242, an SGW 244, and an eNB 246. As shown, the UE bearers may traverse an initial path (PathI) 201 when the MRN 270 is attached to the initial DeNB 220. The UE bearers may thereafter be transferred to a post-handover path (PathH) 202 when the MRN 270 is handed over from the initial DeNB 220 to the target DeNB 240. The UE bearers may subsequently be transferred to a post-optimization path (PATHO) 203 pursuant to embodiment path optimization techniques described in this disclosure.

FIGS. 3A-3E illustrate the various stages of a handover and subsequent path optimization in a mobile relay network 300. The mobile relay network 300 may be similar to the mobile relay network 200, and may include a UE CN 310, an initial DeNB 320, a target DeNB 340, an MRN 370, and a plurality of UEs 380. The mobile relay network 300 may also include a mobile relay node mobility management entity (MRN MME) 390, which may be coupled to the DeNBs, 320, 340 via a control plane. The DeNBs 320, 340 may be similar to the DeNBs 220, 240 (respectively), with the initial DeNB 320 including an initial MRN PGW 322, an initial MRN SGW 324, and an initial eNB 326, and the target DeNB 340 including a target MRN PGW 342, a target MRN SGW 344, and a target eNB 346. The UE bearers carrying data to the UEs 380 are represented by the dashed line, the dash-dotted line, and the dash-dot-dotted line.

Figure 3A:
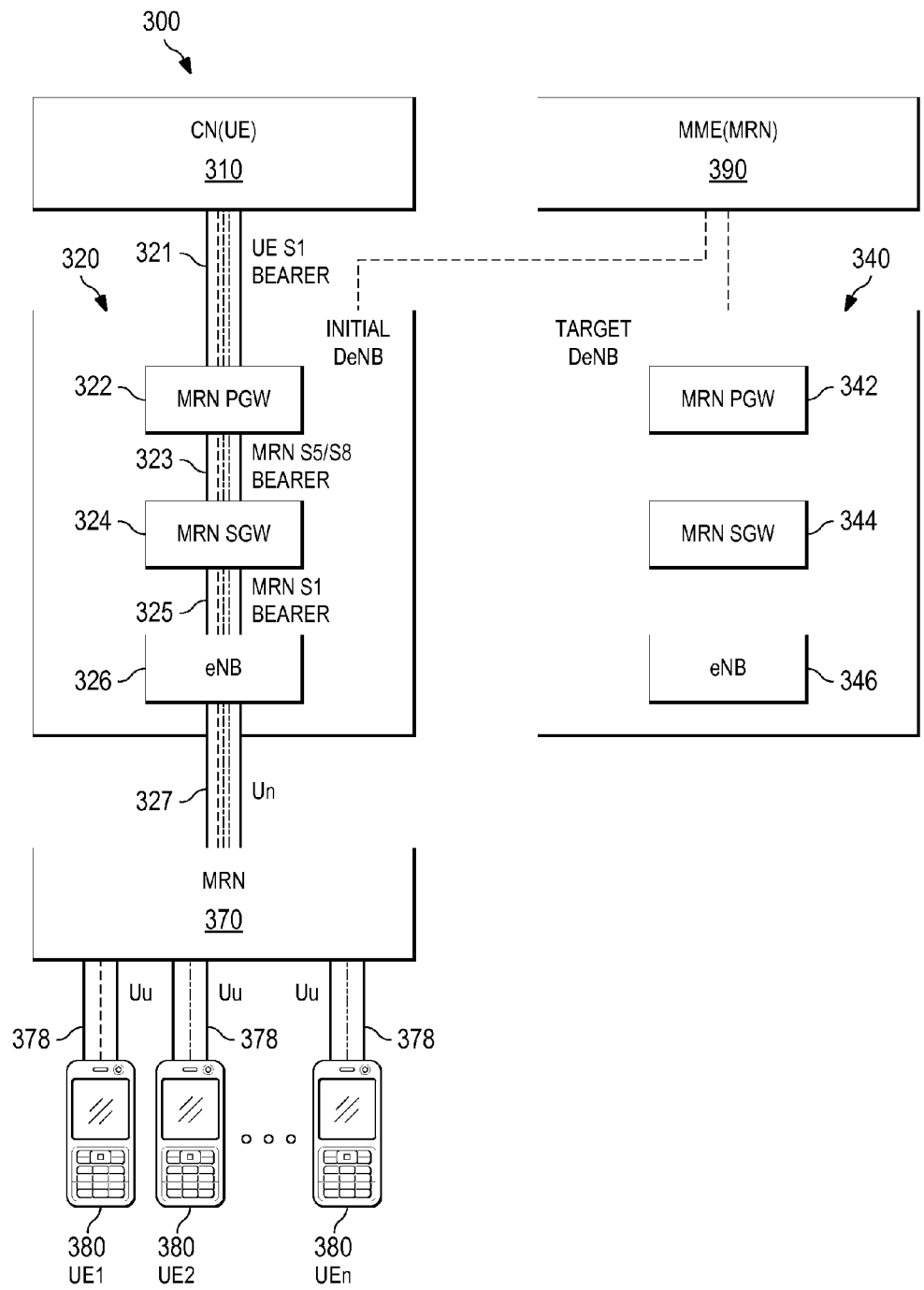
FIGS. 3A-3E illustrate a diagram of bearer interfaces and paths in a mobile relay network architecture during various stages of path optimization.

As shown in FIG. 3A, the UE bearers are routed over an initial bearer path extending from the UE CN 310 to the MRN 370 as well as over a plurality of Uu radio interfaces 378 extending between the MRN 370 and the UEs 380. The initial bearer includes a UE S1 bearer interface 321, an MRN S5/S8 bearer interface 323, an MRN S1 bearer interface 325, and a Un radio interface 327. The UE S1 bearer interface extends between the UE CN 310 and the initial MRN PGW 321, the MRN S5/S8 bearer interface 323 extends between the initial MRN PGW 322 and the initial MRN SGW 324, the MRN S1 bearer interface 325 extends between the initial MRN SGW 324 and the initial eNB 326, and the Un radio interface 327 extends between the initial eNB 326 and the MRN 370.

Figure 3B:
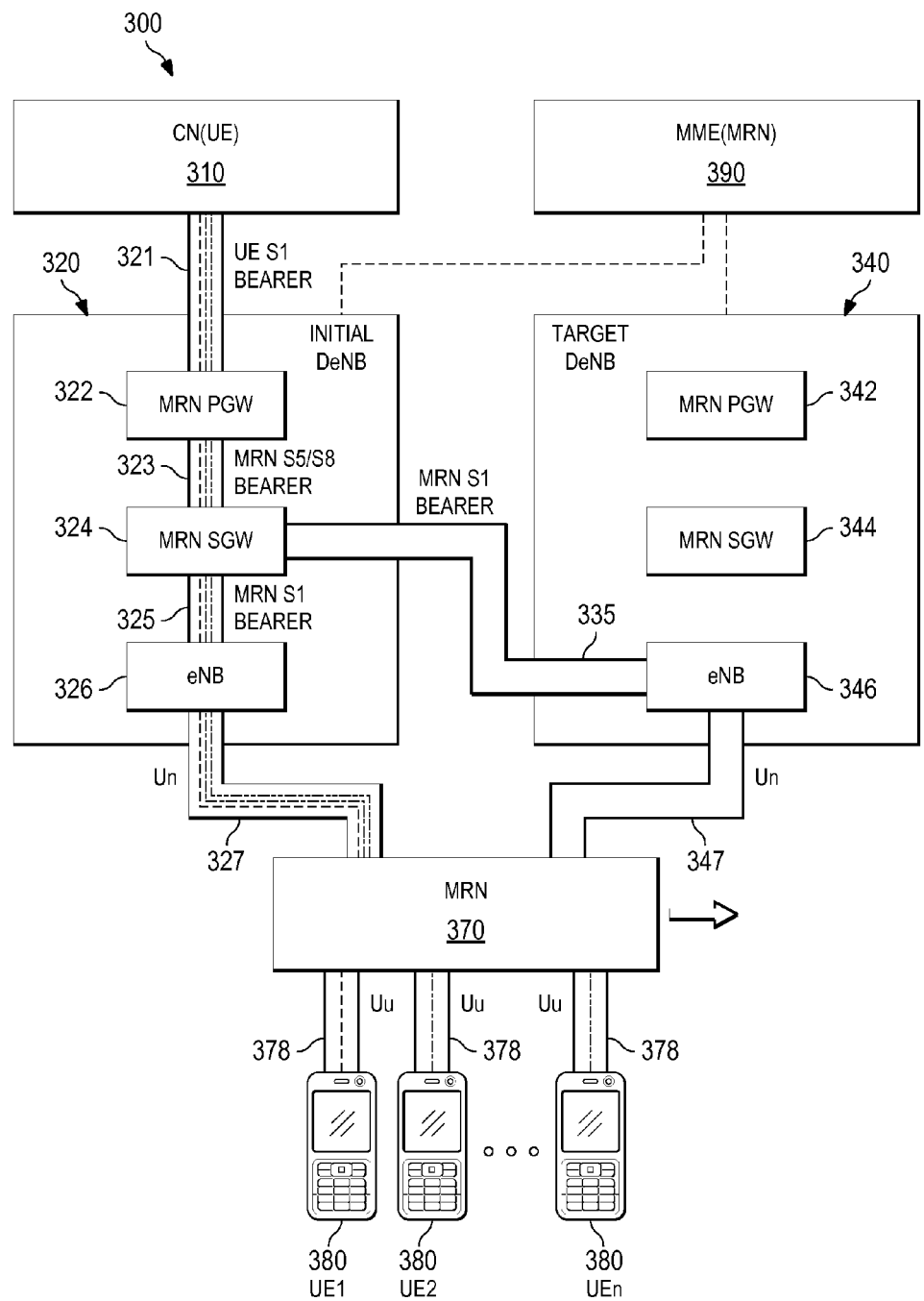
Figure 3C:
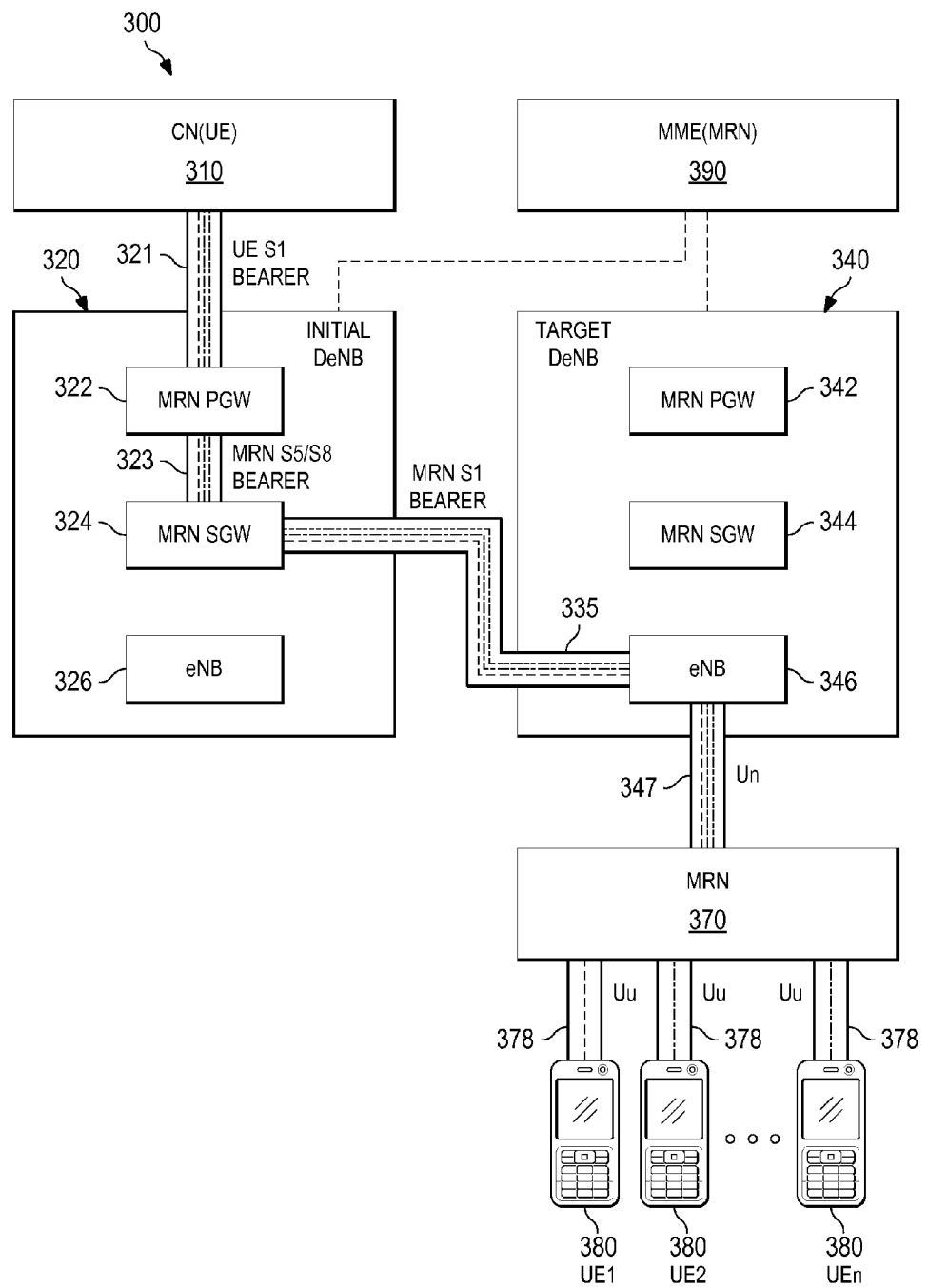

A handover occurs when the MRN 370 migrates into a coverage area of the target DeNB 340. FIGS. 3B-3C illustrate the different stages of the handover, which include establishing a Un radio interface 347 between the MRN 370 and the target eNB 346, switching the path of the MRN S1 bearer interface from the old path 325, to a new path 335, between the target eNB 346 and the initial MRN SGW 324, and releasing the Un bearer interface 327 bearer. As shown, the post-handover bearer path includes the external bearer interface 321, the MRN S5/S8 bearer interface 323, the MRN S1 bearer interface 335, and the Un radio interface 347. The UE bearers are encapsulated with the MRN S1 interface, and hence follow the new path 335.

Figure 3D:
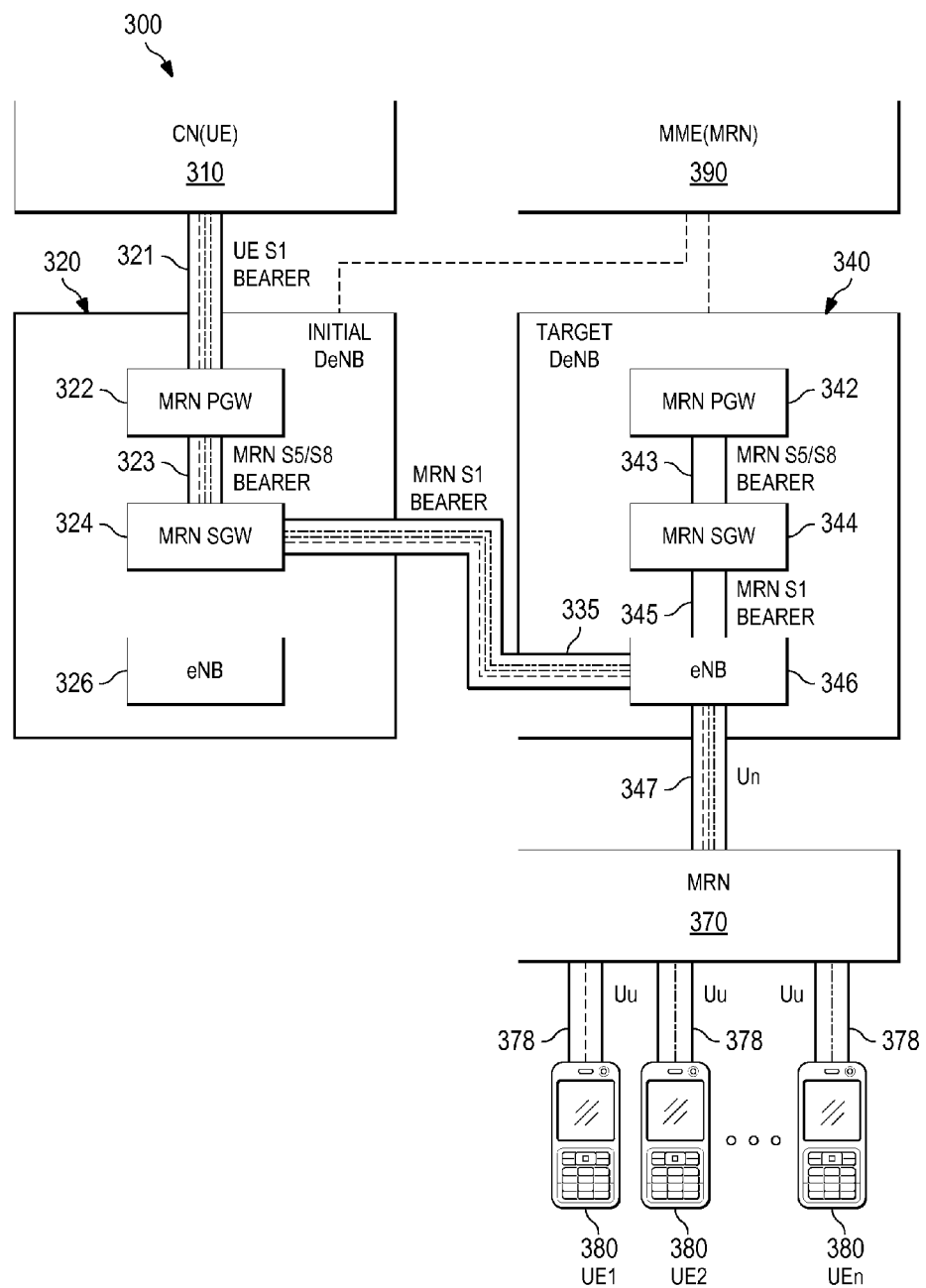
Figure 3E:
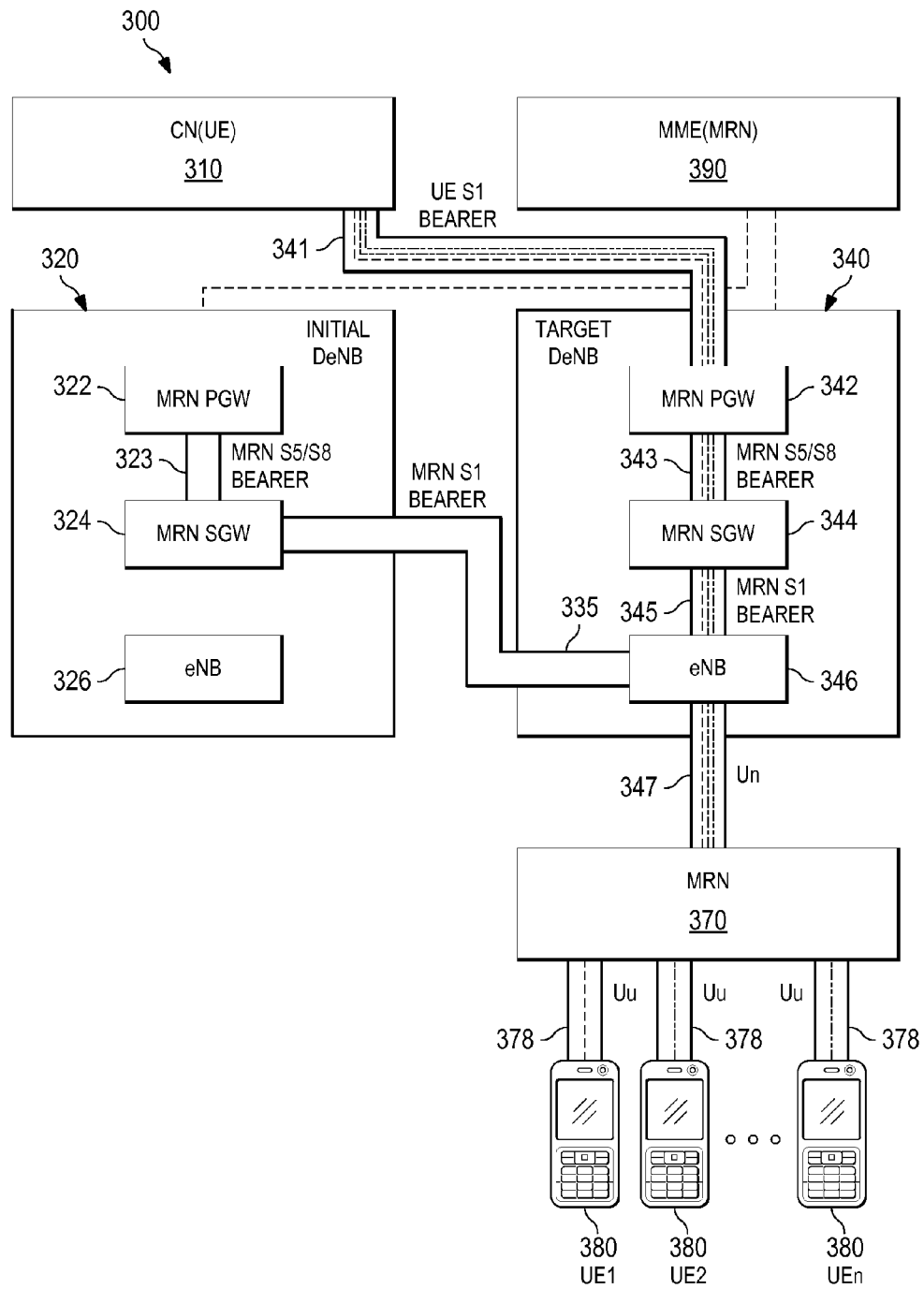

After the handover is complete, a path optimization is performed to establish a direct bearer path between the UE CN 310 and the target DeNB 340. FIGS. 3D-3E illustrate the different stages of the path optimization, which include constructing new interfaces for the post-optimization path, transferring the UE bearers from the post-handover bearer path to a post-optimization bearer path, and tearing down unused interfaces of the initial DeNB. More specifically, the path optimization includes establishing an MRN S1 bearer interface 345 between the target eNB 356 and the target MRN SGW 344, establishing an MRN S5/S8 bearer interface 343 between the target MRN SGW 344 and the target MRN PGW 342. Thereafter, the UE bearers are transferred from the post-handover bearer path thru the initial DeNB and target DeNB, to the post-optimization bearer path thru the target DeNB only. Finally, the MRN S1 interface 335, and the MRN S5/S8 bearer interface 323 are torn down.

Figure 4:
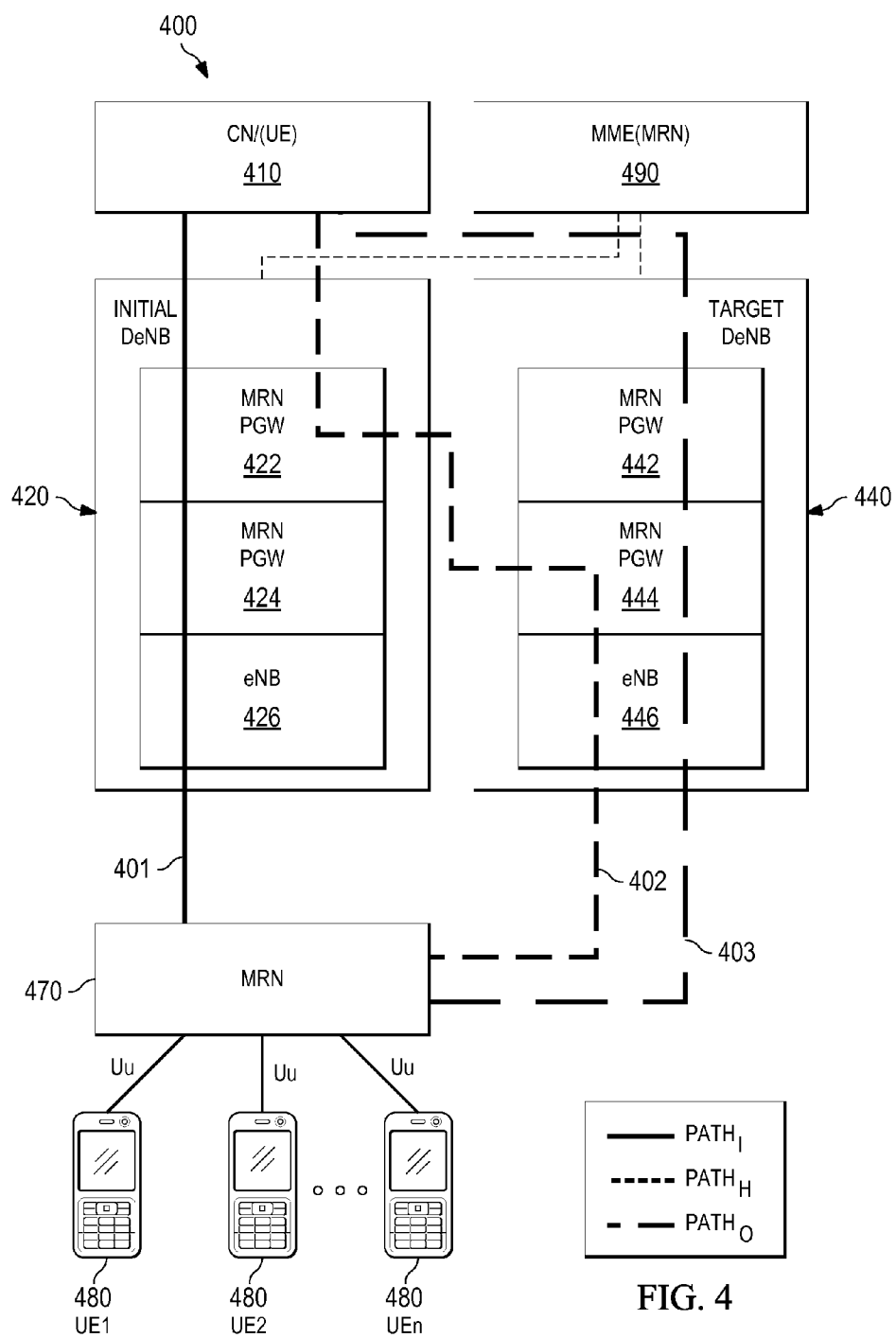
FIG. 4 illustrates a diagram of bearer paths in another mobile relay network architecture.

The path optimization techniques described above follow handovers in which the MRN S1 bearer interface is re-routed from an initial SGW to the target eNB. However, these path optimization techniques are equally applicable following handovers in which the MRN S5/S8 bearer interface is re-routed from the initial PGW to the target SGW. FIG. 4 illustrates the various bearer paths in a mobile relay network 400 resulting from a path optimization following a handover in which the MRN S5/S8 interface (rather than the MRN S1 interface) is re-routed. As shown, mobile relay network 400 may be similar to the mobile relay network 200, and may include an UE CN 410, an initial DeNB 420, a target DeNB 440, an MRN 470, and a plurality of UEs 480. The mobile relay network 400 may also include a MRN MME 490, which may be coupled to the DeNBs, 420, 440 via a control plane. The DeNBs 420, 440 may be similar to the DeNBs 220, 240 (respectively), with the initial DeNB 420 including an initial MRN PGW 422, an initial MRN SGW 424, and an initial eNB 426, and the target DeNB 440 including a target MRN PGW 442, a target MRN SGW 444, and a target eNB 446. As shown, the UE bearers traverse an initial path (PathI) 401 prior to a handover, a post-handover path (PathH) 402 following the handover, and a post-optimization path (PATHO) 403 following a path optimization.

Figure 5A:
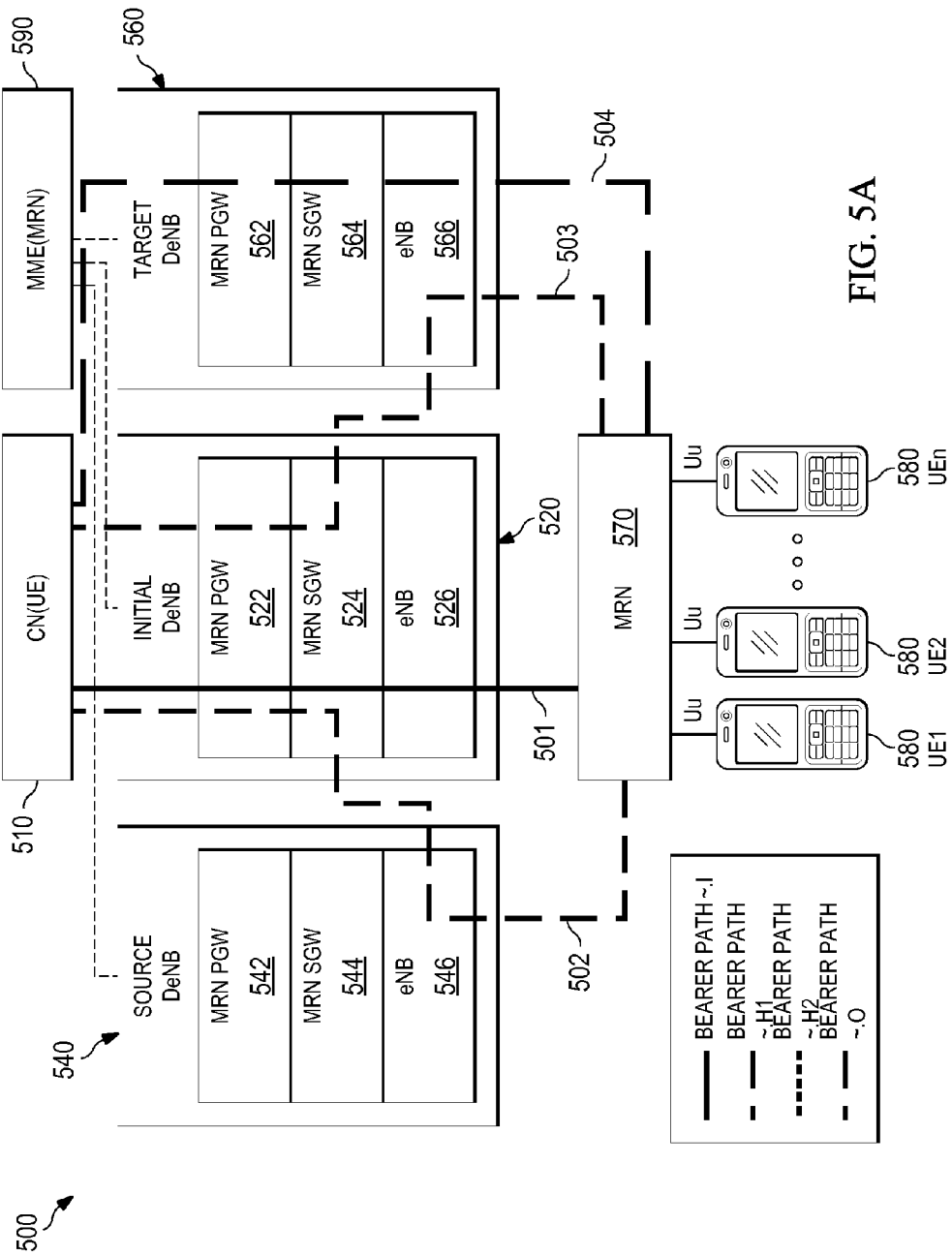
FIG. 5A-5B illustrate diagrams of bearer paths in yet another mobile relay network architecture.
Figure 5B:
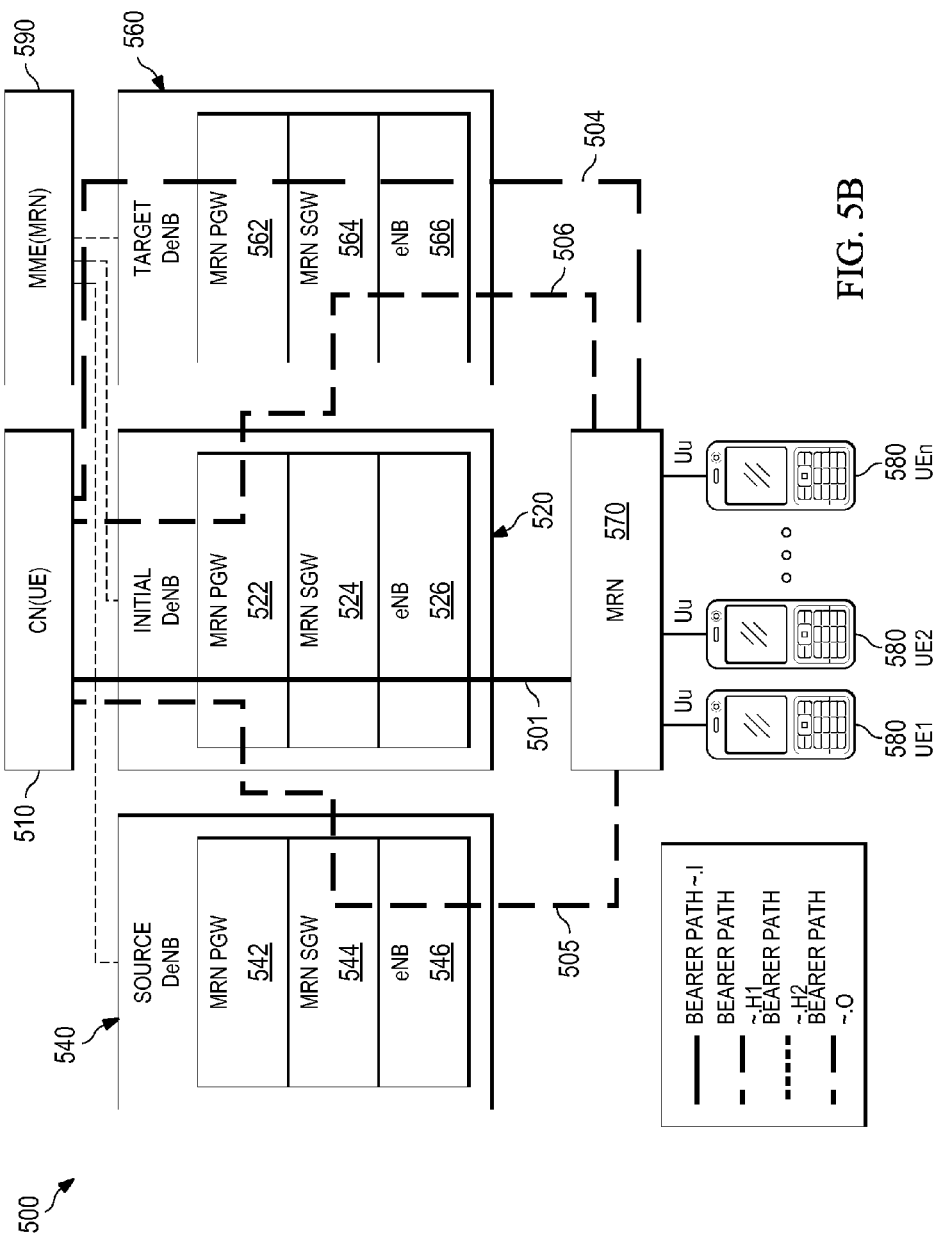

The path optimization techniques described above follow a single handover between an initial DeNB to a target DeNB. However, these path optimization techniques are equally applicable following multiple handovers, in which the MRN accesses one or more intermediate DeNBs before performing a path optimization at a target DeNB. FIG. 5A illustrates the various bearer paths in a mobile relay network 500 resulting from a path optimization following multiple handovers. As shown, mobile relay network 500 includes an UE CN 510, an initial DeNB 520, a source DeNB 540, a target DeNB 560, an MRN 570, and a plurality of UEs 580. The mobile relay network 500 may also include a MRN MME 590, which may be coupled to the DeNBs, 520, 540, 560 via a control plane. The DeNBs 520, 540, 560 may be wireless APS. The initial DeNB 520 includes a MRN PGW 522, an MRN SGW 524, and an eNB 526, the source DeNB 540 includes a MRN PGW 542, an MRN SGW 544, and an eNB 546, and the target DeNB 560 includes a MRN PGW 562, an MRN SGW 564, and an eNB 566. As shown, the UE bearers traverse an initial path (PathI) 501 prior to a first handover, a first post-handover path (PathH1) 502 between the first handover and a second handover, a second post-handover path (PathH2) 503 after the second handover, and a post-optimization path (PATHO) 504 following a path optimization. The path optimization techniques described herein are also applicable following multiple handovers in which the MRN S5/S8 bearer interfaces are re-routed from a MRN PGW in the initial DeNB to MRN SGWs in the source and target DeNBs. FIG. 5B illustrates the various bearer paths in the mobile relay network 500 resulting from a path optimization following two handovers in which the MRN S5/S8 interface (rather than the MRN S1 interface) is re-routed. As shown, the UE bearers traverse an initial path (PathI) 501 prior to a first handover, a first post-handover path (PathH1) 505 between the first handover and a second handover, a second post-handover path (PathH2) 506 after the second handover, and a post-optimization path (PATHO) 504 following a path optimization. As shown, a first post-handover path (PathH1) 505 extends through the source MRN SGW 544 (rather than the initial MRN SGW 524), while the second post-handover path (PathH2) 506 extends through the target MRN SGW 564 (rather than the initial MRN SGW 524).

Figure 6A:
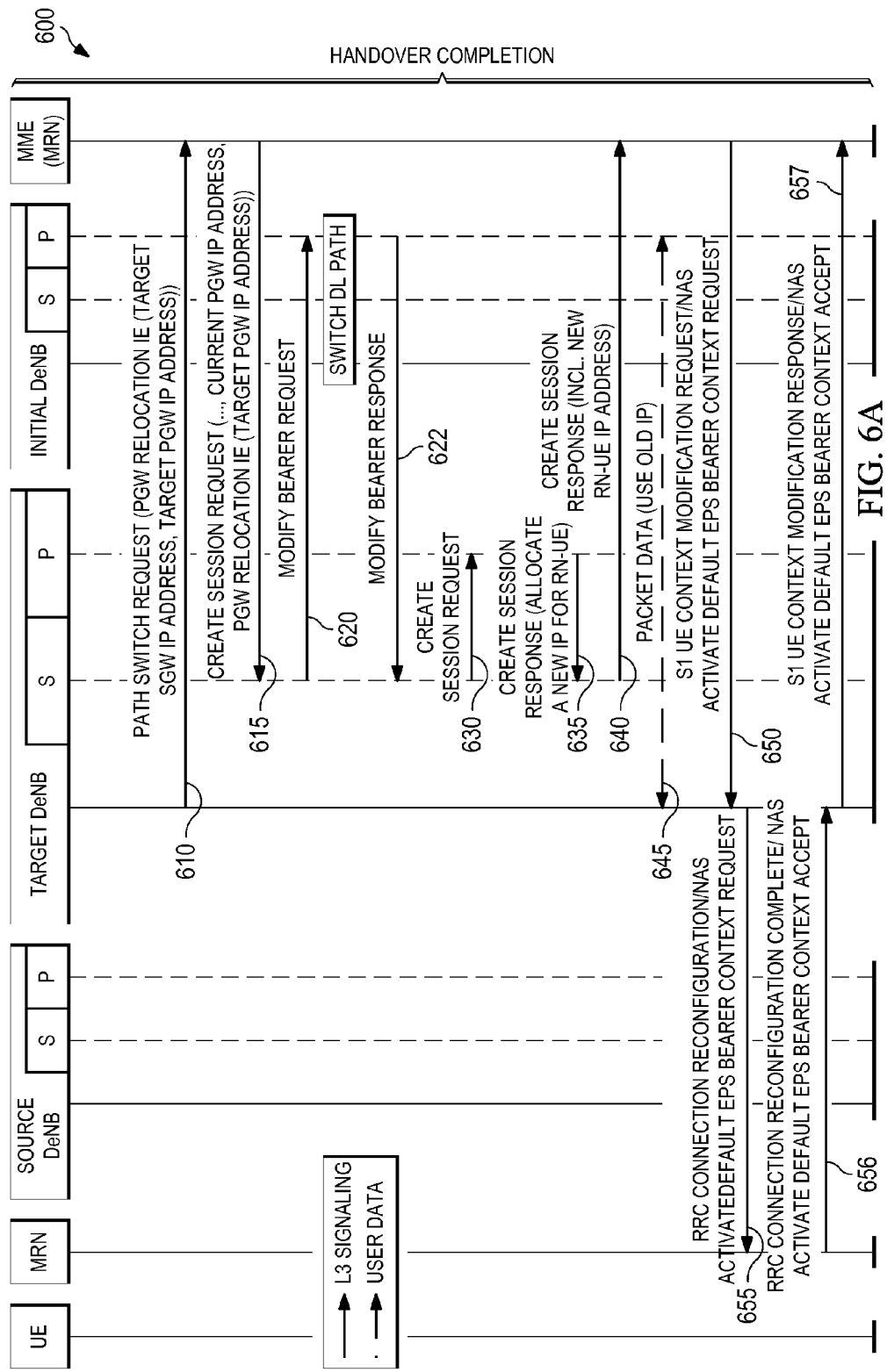
FIGS. 6A-6B illustrate protocol diagrams of embodiment path optimization messaging sequences in a mobile relay architecture.
Figure 6B:
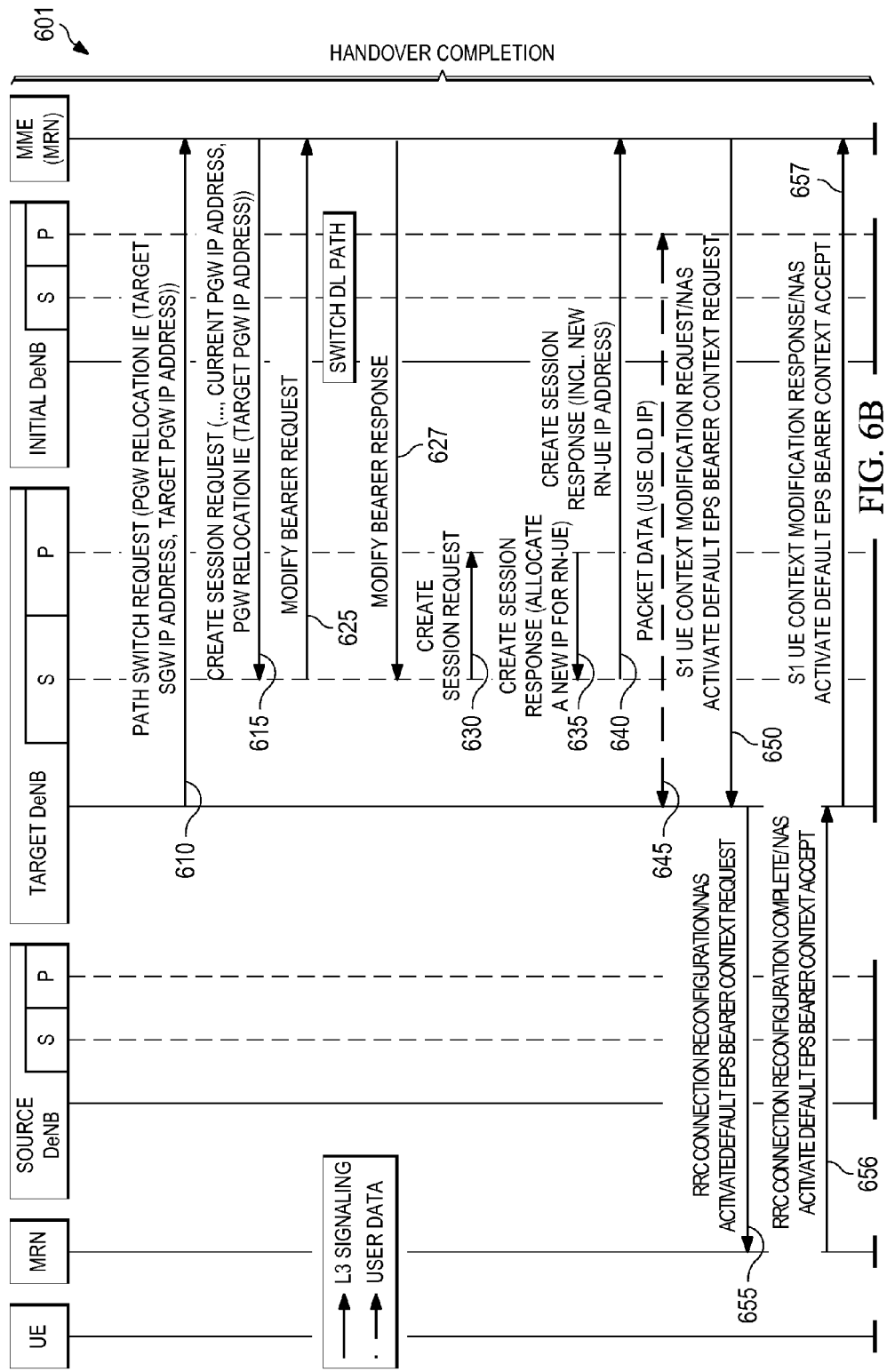

Aspects of this disclosure provide path optimization signaling between network devices of a mobile relay architecture. FIGS. 6A-6B illustrate embodiment messaging sequences 600, 601 for achieving path optimization in a mobile relay architecture, as might be performed following the handover of a MRN from a source DeNB to a target DeNB. The embodiment messaging sequence 600 is configured to perform path optimization when an MRN S1 interface is re-routed during a handover, while the embodiment messaging sequence 601 is configured to perform path optimization when an MRN S5/S8 interface is re-routed during a handover. As shown, the embodiment messaging sequences 600, 601 begin when a target DeNB sends a path switch request 610 to the MRN MME. The path switch request 610 includes a PGW relocation information element (IE) indicating that a new relay gateway function for the second bearer path is being instantiated at the target DeNB. The relay gateway function may comprise an MRN PGW function and an MRN SGW function. In response to receiving the path switch request 610, the MRN MME returns a create session path request 615 to the target DeNB. The create session path request 615 includes a PGW relocation information element (IE) that specifies an internet protocol (IP) addresses for a target mobile relay node PGW (MRN PGW) in the target DeNB and an initial MRN PGW in the initial DeNB. The path switch request 610 and create session request 615 serve to initiate the path optimization procedure.

In the embodiment messaging sequence 600, the MRN MME and MRN SGW function in the initial DeNB exchange modify bearer request and response messages 620, 622. The embodiment messaging sequence 600 is used when the handover includes rerouting the MRN S1 interface, as in FIG. 5A. The modify bearer request and response messages 620, 622 switch the path of the MRN S1 interface originating at the MRN SGW function in the initial DeNB. After the path switch, the MRN S1 interface will terminate at the eNB function of the target DeNB.

Alternatively, in the embodiment messaging sequence 601, the target MRN SGW function in the target DeNB and the MME(MRN) may exchange modify bearer request and response messages 625, 627. The embodiment messaging sequence 601 is used when the handover includes rerouting the MRN S5/S8 interface, as in FIG. 5B. The modify bearer request and response messages 625, 627 switch the path of the MRN S5/S8 interface originating at the MRN PGW function in the initial DeNB. After the path switch, the MRN S5/S8 interface will terminate at the newly instantiated target MRN SGW function in the target DeNB.

Next, the MRN SGW function and MRN PGW function in the target DeNB exchange create session request and response messages 630, 635, which setup a new MRN S5/S8 interface internal to the target DeNB. In addition, the MRN PGW function in the target DeNB will allocate a new IP address for the MRN to support the optimized bearer path from the MRN PGW function to the MRN.

Thereafter, the MRN SGW function in the target eNB sends a create session response message 640 to the MRN MME, which notifies the MRN MME of the creation of the optimized bearer path and the new RN-UE IP address. Thereafter, the MME sends an S1 UE context modification request 650 to the target DeNB. The S1 UE context modification request 650 instructs the eNB function in the target DeNB to add the optimized bearer path information to the MRN context in the target DeNB. With this the target DeNB knows to map any packets between the new MRN S1 bearer and the Un interface to the MRN, and so binds the new MRN S1 bearer to the existing Un interface radio bearers.

The S1 UE context modification request 650 encapsulates a NAS activate default EPS bearer context request message that instructs the MRN to active the optimized bearer path. The target DeNB forwards the NAS activate default EPS bearer context request message to the MRN transparently using an RRC connection configuration message 655. The MRN returns an NAS activate default EPS bearer context accept message to the target DeNB using an RRC reconfiguration complete message 656. The NAS activate default EPS bearer context accept message indicates that the optimized bearer path has been activated by the MRN. The target DeNB then transparently forwards the NAS activate default EPS bearer context accept message to the MME encapsulated in an S1 UE context modification response 657.

Figure 7:
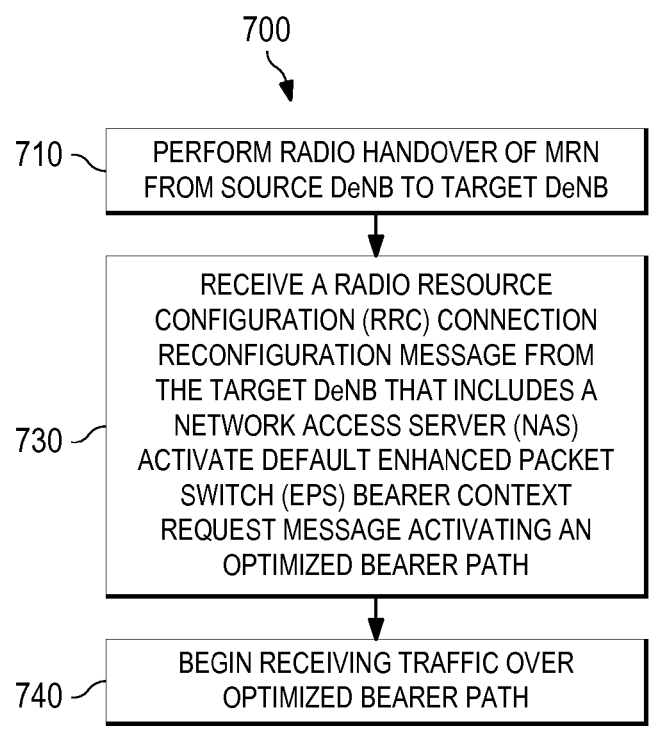
FIG. 7 illustrates a flowchart of an embodiment method for performing path optimization.

FIG. 7 illustrates a method 700 for achieving path optimization, as might be performed by a MRN. As shown, the method 700 begins with step 710, where a radio handover is performed to handover the MRN from a source DeNB to a target DeNB. Next, the method 700 proceeds to step 730, where the mobile relay code receives a radio resource control (RRC) connection reconfiguration message from the target DeNB. The RRC connection reconfiguration message includes a (NAS) activate default enhanced packet switch (EPS) bearer context request message that activates an optimized bearer path. Subsequently, the method proceeds to step 740, where the MRN begins receiving traffic over the optimized bearer path.

Figure 8:
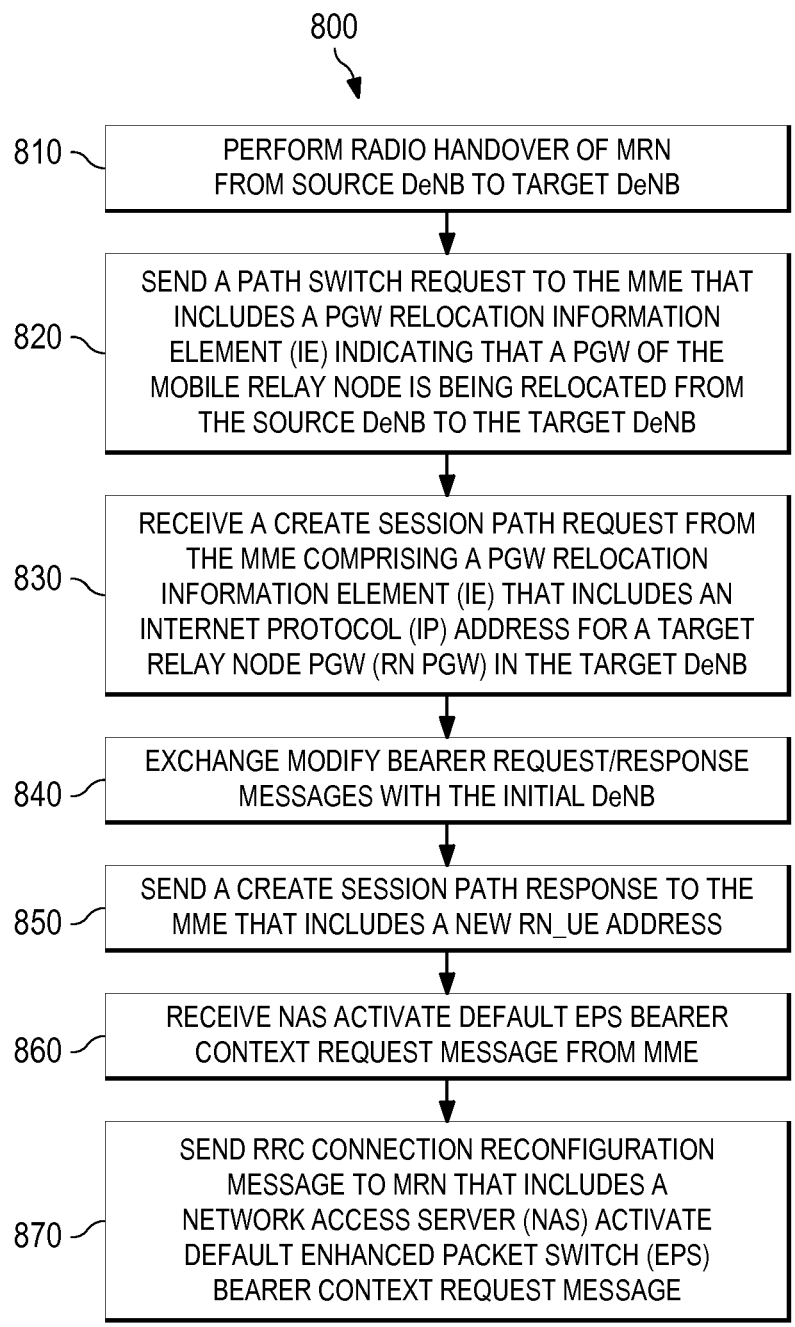
FIG. 8 illustrates a flowchart of another embodiment method for performing path optimization.

FIG. 8 illustrates a method 800 for achieving path optimization, as might be performed by a target DeNB. As shown, the method 800 begins at step 810, where the target DeNB performs a radio handover to transfer the MRN from a source DeNB to a target DeNB. Thereafter, the method 800 proceeds to step 820, where the target DeNB sends a path switch request to the MME. The path switch request includes a PGW relocation IE indicating that a PGW of the MRN is being relocated from the source DeNB to the target DeNB. Next, the method 800 proceeds to step 830, where the target DeNB receives a create session path request from the MME. The create session path request includes a PGW relocation information element (IE) that specifies an internet protocol (IP) address for a target relay node PGW (RN PGW) in the target DeNB. Thereafter, the method 800 optionally proceeds to step 840, where the target DeNB exchanges modify bearer request/response messages with the initial eNB. Subsequently, the method 800 proceeds to step 860, where the target DeNB receives an NAS activate default EPS bearer context request message encapsulated in an S1 UE context modification request message, both from the MME. The S1 UE context modification request message prompts the DeNB to bind the optimized bearer path to the Un interface to the MRN. Next, the method 800 proceeds to step 870, where the target DeNB forwards the NAS activate default EPS bearer context request message to the MRN encapsulated in an RRC connection reconfiguration message. The NAS activate default EPS bearer context request message prompts the MRN to activate the optimized bearer path.

Figure 9:
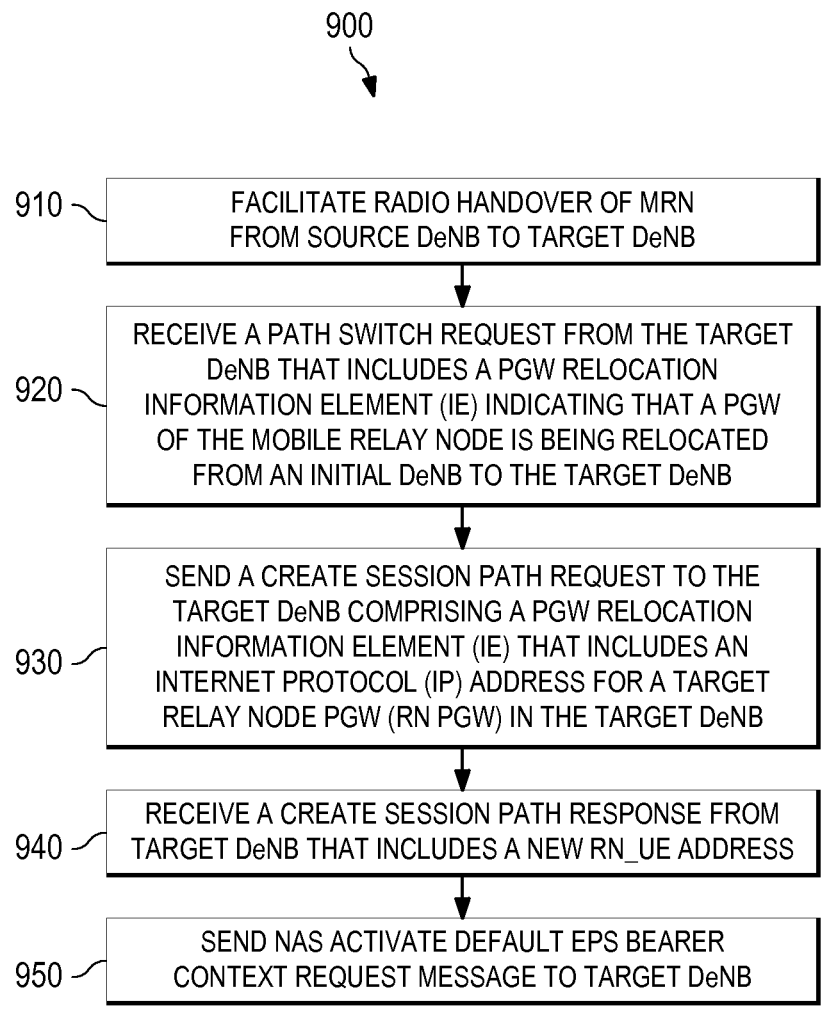
FIG. 9 illustrates a flowchart of yet another embodiment method for performing path optimization.
Figure 10A:
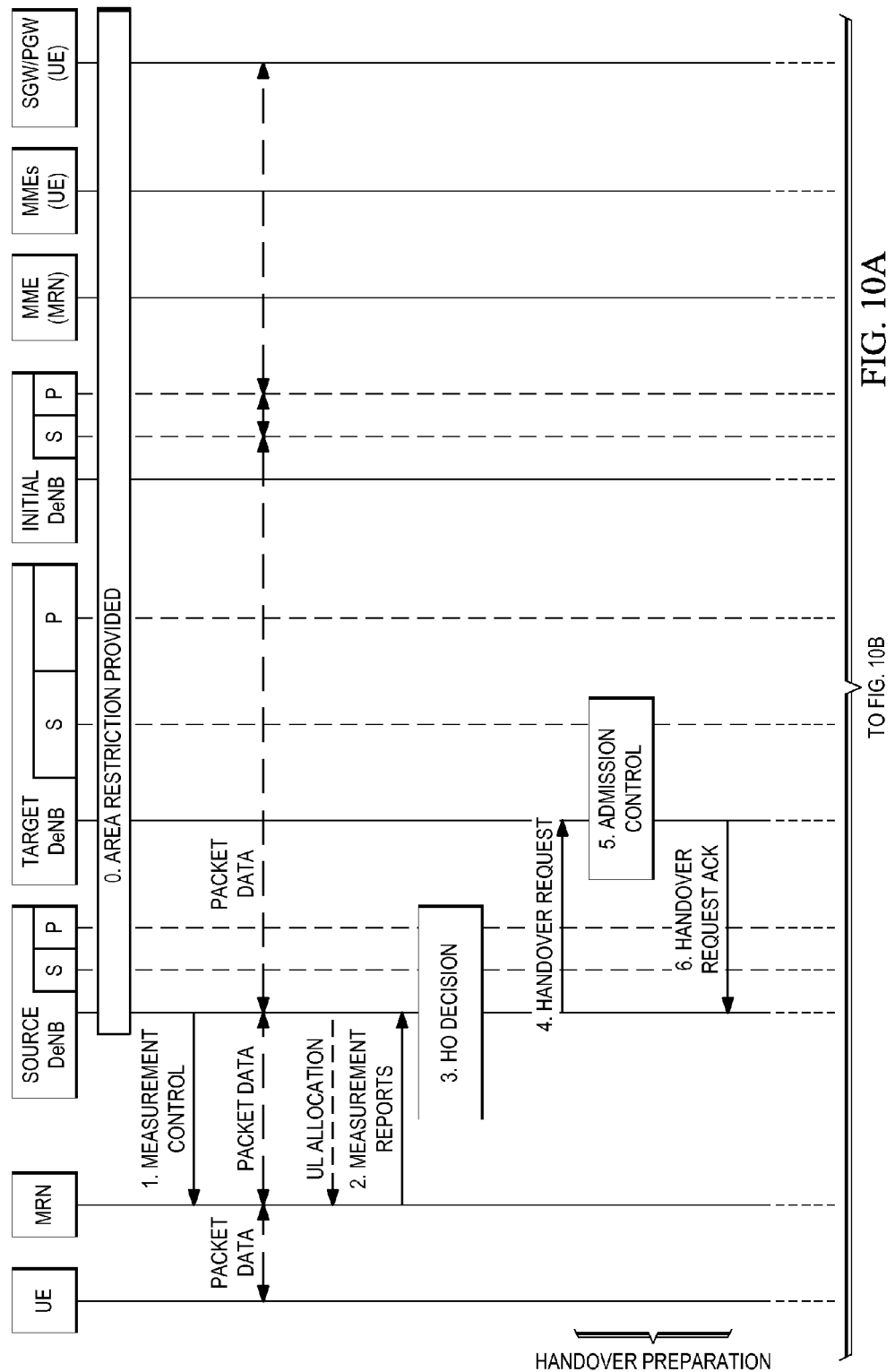
Figure 10C:
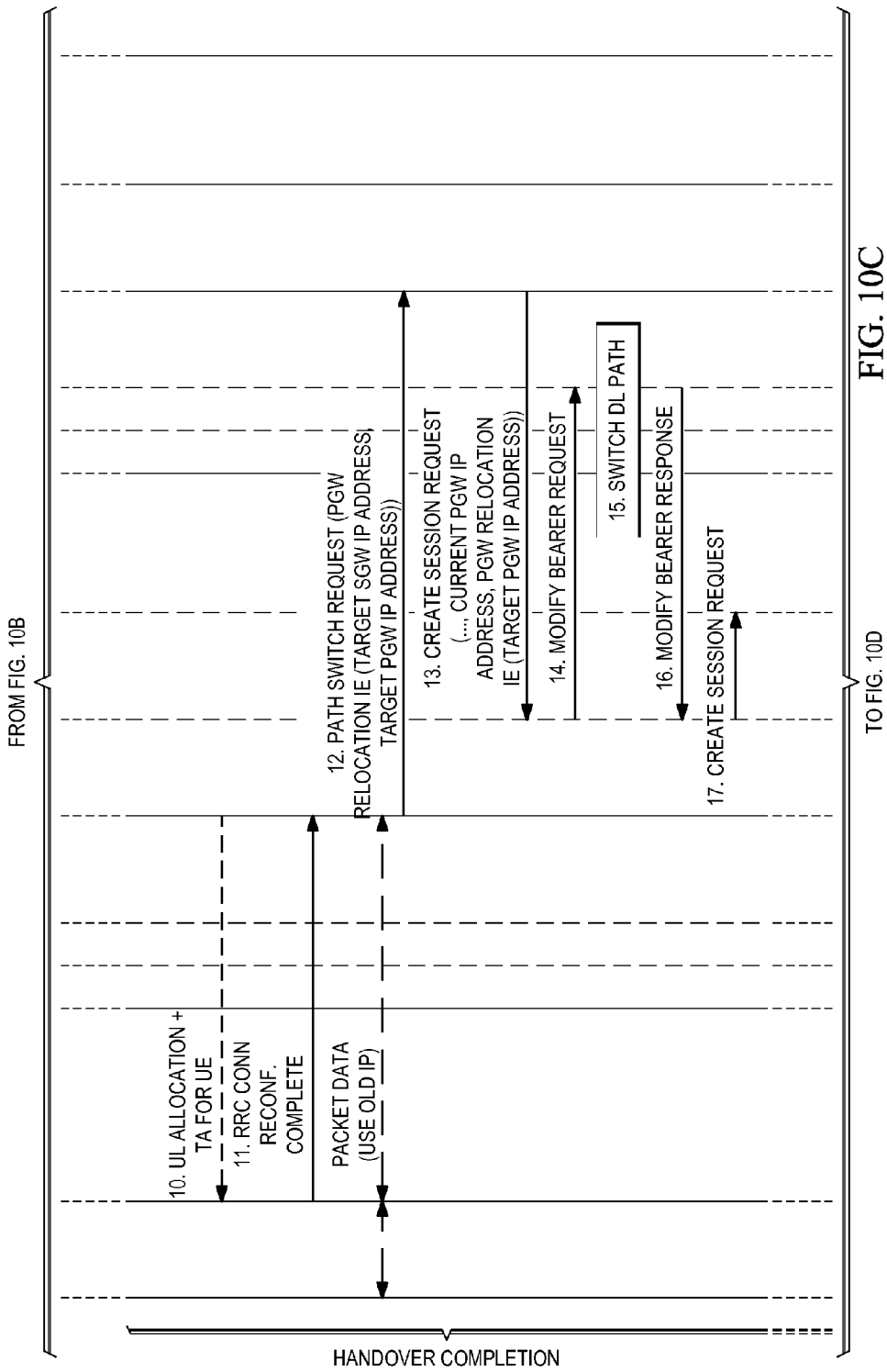
Figure 10D:
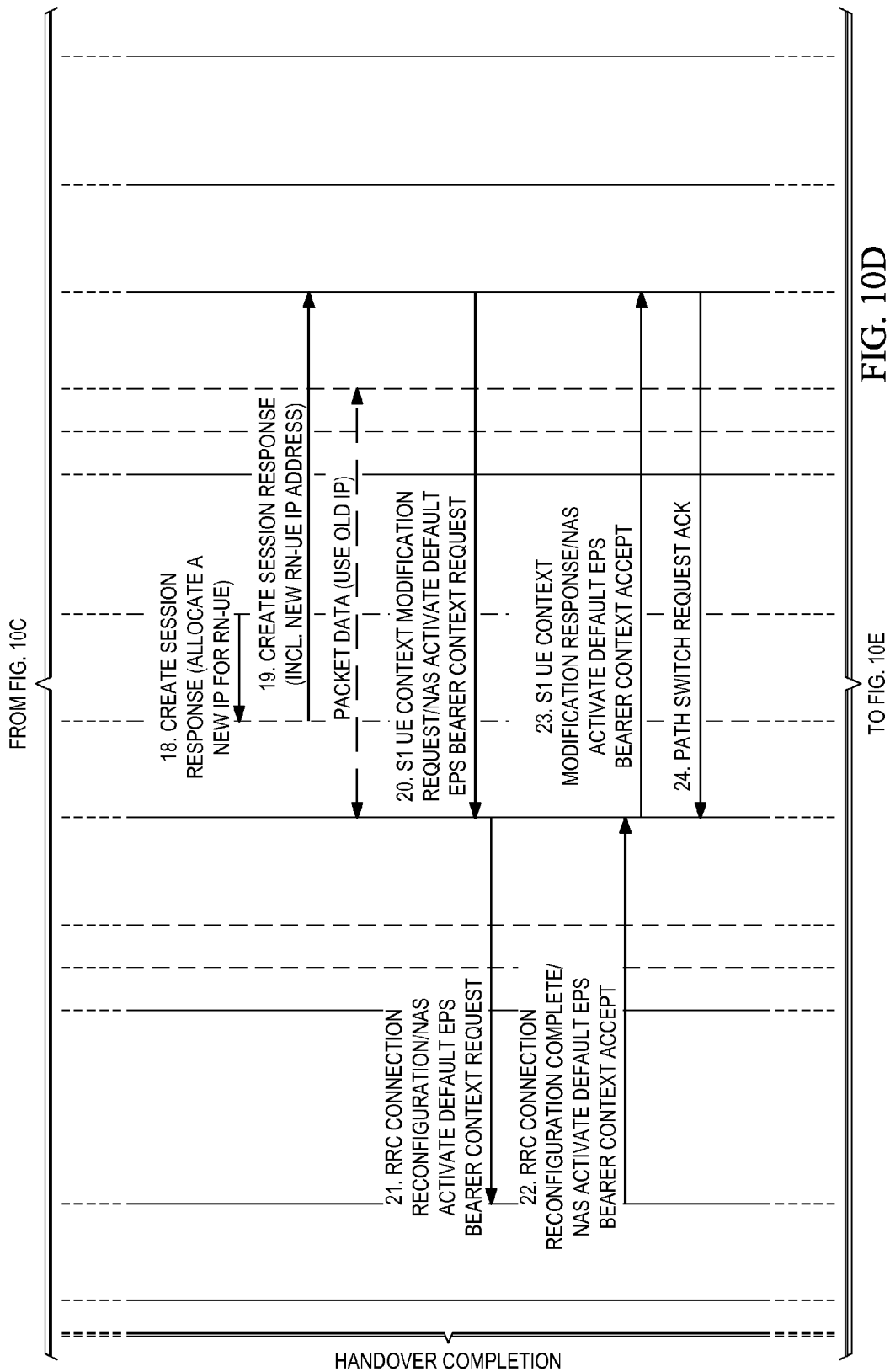
Figure 10E:
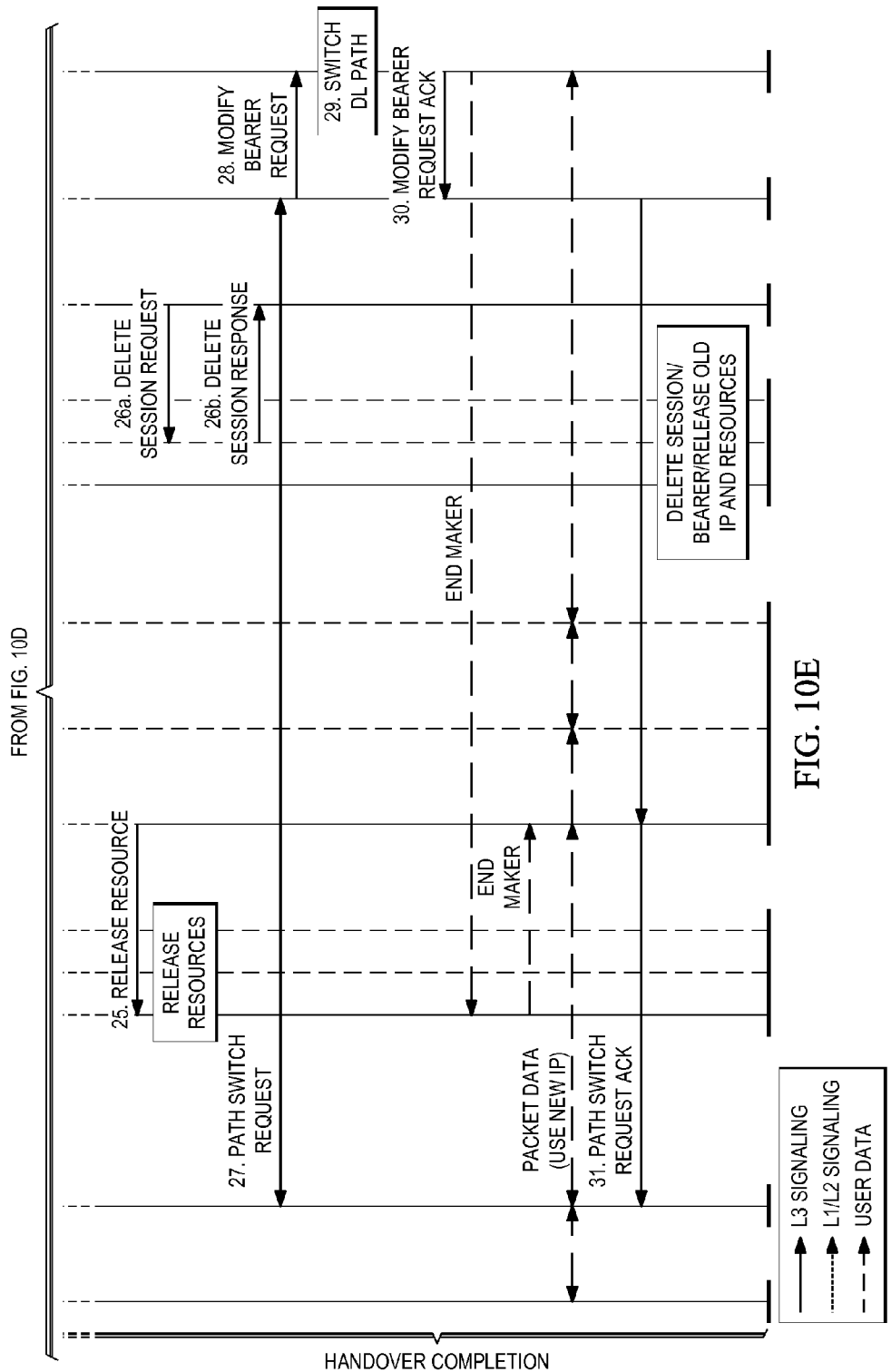

FIG. 9 illustrates a method 900 for achieving path optimization, as might be performed by a mobile management entity (MME) assigned to an MRN. As shown, the method 900 begins with step 910, where the MME facilitates a radio handover to transfer the MRN from a source DeNB to a target DeNB. Thereafter, the method 900 proceeds to step 920, where the MME receives a path switch request from the target DeNB. The path switch request includes a PGW relocation IE indicating that a PGW of the MRN is being relocated from the source DeNB to the target DeNB. Next, the method 900 proceeds to step 930, where MME sends a create session path request to the target DeNB. The create session path request includes a PGW relocation information element (IE) that specifies an internet protocol (IP) address for a target relay node PGW (MRN PGW) in the target DeNB. Thereafter, the method 900 proceeds to step 940, where the MME receives a create session path response from the target DeNB. The create session path response informs the MRN MME that a session for the optimized bearer path has been created between the MRN SGW and MRN PGW functions in the target DeNB, and includes a new RN_UE IP address. Subsequently, the method 900 proceeds to step 950, where the MME sends a The S1 UE context modification request to the target DeNB, and an NAS activate default EPS bearer context request message to the MRN thru the target DeNB. The S1 UE context modification request prompts the target DeNB to bind the optimized bearer path to the Un interface to the MRN. The EPS bearer context request message prompts the MRN to activate the optimized bearer path.

Aspects of this disclosure provide support for the relocation of a RN's PGW in the case of Alt. 2 architecture. When the RN has moved very far from the location of the initial DeNB, and the data path to the RN's PGW is very long. Then in the next handover of the RN to a new DeNB, a new SGW function for the RN is instantiated in the new target DeNB, or the SGW of the RN is relocated from the initial DeNB to the new target DeNB, using the SGW relocation procedure. Then the new SGW creates a new IP session for the RN to the local IP gateway in the target DeNB. In addition, if the SGW is relocated from the initial DeNB, the SGW function modifies the existing IP session for the RN, so that the corresponding IP bearers are connected from the old RN PGW to the new SGW. Thus two IP sessions will be configured for the RN; the original IP session to the remote PGW located in the initial DeNB, and a new IP session to the local PGW located in the target DeNB. Following this, IP data flows through the old IP session can be moved to the new IP session, and the old IP session can be released. Aspects of this disclosure set forth the protocol and signaling enhancements for enabling relocation of an MRN's SGW/PGW from the initial DeNB to the target DeNB, as well as for enabling the creation of the new IP session from the new PGW in the target DeNB to the RN.

Aspects of this disclosure provide support for the relocation of a RN's PGW in the case of Alt. 2 architecture. In this architecture, the RN's PGW is located in the initial DeNB, When the RN moves to a new DeNB, the PGW and serving gateway SGW for the RN remain anchored at the initial DeNB. This continues through subsequent handovers of the RN.

In the case of a RN the RN's PGW may be located in the Enhanced Packet Core (EPC), or in the DeNB. The former approach is known as Alternative 1 RN architecture, while the latter is known as Alternative 2 RN architecture. The current LTE standard does not support the relocation of a UE's PGW, without disruption of all IP flows to that UE. This was not a limitation when considering fixed relay nodes, as the PGW does not need to be relocated. However, with MRNs, there is a need to support the relocation of the RN's PGW in order to optimize the length of the data path to the relay node. In particular, in the case of a relay node deployed in a vehicle such as a train, the relay may travel very far from the location of the initial PGW. This will lead to large transmission delays in the RN's backhaul, and non-optimal data forwarding. In some cases, the RN may no longer be able to connect to a distant PGW at all (for example due to roaming into another country or operator's network). Thus there is a need to a seamless relocation procedure for the PGW of mobile RNs.

At some point the RN has moved very far from the location of the initial DeNB, and the data path to the PGW is very long. Then in the next handover of the RN to a new DeNB, a new SGW function may be instantiated for the RN in the new target DeNB, or the SGW of the RN is relocated from the initial DeNB to the new target DeNB. Relocation of the RN's SGW, if implemented, utilizes an existing standard procedure for SGW relocation. Normally, as part of a SGW relocation procedure, the new SGW would send a Modify Bearer Request message to the UE's PGW, so that the data path from the PGW to the new SGW can be established. In one solution, in addition to this redirection of the data path from the current (remote) PGW to the new SGW, the SGW will also create a new IP session to the PGW functionality in the target DeNB. Thus two IP sessions will be configured for the RN; the original IP session to the remote PGW located in the initial DeNB, and a new IP session to the local PGW located in the target DeNB.

Subsequent to this, IP flows to the RN through the old IP session's bearers can be transferred to the new IP session's bearers, using existing standard procedures such a bearer path switch. Once all the bearers from the old IP session have been transferred to the new IP session, the RN can release the IP session to the old PGW. Alternatively, the RN may simply wait for the bearers through the old IP session to be released once the related IP flows are no longer in use, and then release the old IP session. Using this method, seamless support for RN PGW relocation is obtained.

Aspects of this disclosure set forth the required protocol and signaling enhancements needed to enable the instantiation of the new SGW function in the target DeNB, or SGW relocation from the initial DeNB to the target DeNB, and the creation of the new IP session from the new PGW in the target DeNB to the RN.

R3-120610 describes the concept of creating a new IP session to the local PGW from the relocated SGW. However, R3-120610 does not provide a complete solution because R3-120610 does not address the following elements: How and where the PGW relocation decision is made: How the RN's mobility management entity MME is informed about the PGW relocation. How the RN MME is informed of the IP address for the target SGW and PGW (which is necessary for the MME to direct the create session request to the specific S/PGW function in the target DeNB). How the target DeNB is informed of the new IP session and corresponding RN bearers that are in addition to the existing RN IP session (update of the RN context), How the new IP session information and new RN IP address are communicated to the RN.

Aspects of this disclosure addresses all of the details above to enable a true seamless solution for RN PGW relocation, and includes the following features: The PGW relocation is triggered by a RN HO to a new DeNB. The new DeNB recognizes that the IP address of the current RN's SGW is remote, and PGW relocation is needed; The target DeNB send a Path Switch request to the RN's MME. A new PGW Relocation IE is included in this message. This IE informs the MME that a PGW relocation procedure is needed, and it provided the IP addresses for the SGW & PGW functionality local to the target DeNB; The RN MME sends a Create Session Request back the SGW functionality local to the target DeNB. This message also contains the PGW Relocation IE, which informs the SGW that this is not a normal session creation, but a session creating for PGW relocation. In this case, the PGW Relocation IE contains only the IP address for the local PGW functionality; The local SGW creates a new session for the RN. It may modify the existing session to the current PGW in the initial DeNB, and it creates another session with the local PGW. It confirms back to the RN MME with appropriate session addressing information, and a locally allocated IP address for the RN; The RN MME sends an Activate Default EPS Bearer Context Request to the RN to inform it of the new IP session and IP address. This message is enhanced to inform the RN that this additional IP session is due to a PGW relocation; and In addition, the RN MME sends a UE Context Modification Request to the target DeNB, so that the target DeNB can update the context for the RN, and bind the new data session to the Un interface between the target DeNB and RN. This message is enhanced to inform the DeNB that the new IP session is due to a PGW relocation.

The issue of PGW relocation for path optimization has been raised as an option for Mobile Relay architecture. If the PGW remains unchanged as the train travels, the transmission delay for UE's S1 user plane and control plane will become longer. Thus path optimization should be considered. This disclosure analyses the path optimization of the candidate mobile relay options (Alt.1, Alt.2 and Alt.2 based solutions) and gives a PGW relocation mechanism suitable for Alt. 2 and Alt. 2 based solutions. The candidate mobile relay options are described in third generation partnership project (3GPP) technical report (TR) 36.836 (2013-10), which is incorporated by reference herein as if reproduced in its entirety. Alt.2-1 has a natural advantage to do PGW relocation. The P/SGW is collocated with the DeNB and changes together with the DeNB every time HO occurs. When the MRN travels into the overlap region of the source DeNB and the target DeNB, the RN-UE2 will attach to the target DeNB and gain a new IP address allocated by the target PGW while the RN-UE1 is still connected with the source DeNB. After the RN-UE2 has established the connection with target DeNB, it will trigger a path switch process to change the DL path of UE data to the target DeNB. The source DeNB continues forwarding the buffered user data to RN-UE1 where these data are directly transferred to RN-Cell. During this HO process, the user service is well maintained, and the data path is optimized.

But for the other architectures like Alt.1/Alt.2/Alt.2-2/ Alt.2-3, before the PGW is relocated, the length of data path will become longer as the train travels. Thus two separate situations are observed. First, if the train has just travelled from the departure station or the PGW has just been relocated. In this situation, the PGW is close to the target DeNB, so the PGW relocation or redirection may not be required. But in another situation, the PGW may be from the target DeNB and the transmission delay is large, or the target DeNB may no longer have IP connectivity with the RN PGW. Then the PGW relocation for path optimization is needed. The following text analyzes these two situations successively.

The PGW is not changed during the mobile relay handover no matter the P/SGW is located outside the DeNB for Alt.1 and Alt.2-3, or collocated with the DeNB for Alt.2 and Alt.2-2. When the UE's MME/SGW sends data to mobile RN, the data has to be sent to the mobile RN's initial PGW, and is then sent back to the DeNB. If the PGW is already close to the target DeNB, the P/SGW is not required to be relocated. Then this data transmission manner works reasonably well, and the length of traffic path will be similar for the four architectures. Data transmission without PGW relocation may, in some embodiments, be equivalent for the mobile relay architectures Alt.1/Alt.2/Alt.2-2/Alt.2-3.

The relocation or redirection of PGW of the mobile relay and Relay GW may be needed if the PGW is far from the DeNB. As the train travels along it path, the Relay-GW/ PGW of the mobile relay may be changed more than once for route optimization purposes. When the PGW relocation is required to be done, the situation and solution can be similar regardless of the RN architectures.

The basic idea is that the SGW/PGW serving the mobile RN can be transferred from the initial DeNB to the target DeNB. During the HO process, the mobile RN can temporarily retain the session and bearers allocated by the initial PGW, and the target PGW can allocate a new session and IP address for the mobile RN. When the handover is completed and UE's MME/SGW has changed the DL path to the target DeNB, the initial PGW can deactivate the bearers in the old PDN connection and release the old IP address.

Embodiment messaging sequence for achieving path optimization in a mobile relay architecture may be implemented as part of a larger handover procedure. FIGS. 10A-10E illustrate an embodiment message sequence of a call flow for PGW relocation. This procedure is an extension of the call flow for a standard HO with SGW relocation, except for the new session setup in steps 17-18 and 20-23, and the UE path switch process in steps 27-31.

Enhanced Path Switch Request: The P/SGW relocation decision is made by the target DeNB, and a new PGW Relocation IE indicating that the PGW is going to be relocated is added to the path switch request message. This new IE includes the IP addresses for both the target RN SGW and PGW. A new PGW Relocation IE is also added to the Create Session Request message sent by the MME to the SGW, and the IP address of the target PGW is also included with the Create Session Request message.

Allocate new session and IP address via the PGW in the target DeNB: The target SGW will sends a Create Session Request message to the target PGW (in the target DeNB), then a new RN IP address will be allocated by the target PGW and informed to the SGW in the Create Session Response message. The SGW then informs the MME of the new session information, including new RN IP address in the Create Session Response message. After receiving this message, the MME sends an S1 UE Context Modification Request massage to the target DeNB, to inform the DeNB of the addition of the new PDN session for the mobile RN. A NAS Activate Default EPS Bearer Context Request message is sent along with the S1 UE Context Modification Request, which is then passed transparently to the RN-UE in the RRC Connection Reconfiguration message. The Activate Default EPS Bearer Context Request activates the bearer from the new PGW to the RN, and assigns the new RN IP address. After this process, a new PDN session has been setup while the old RN IP address and the old PDN session are temporarily maintained.

Path optimization for UE bearers: The path of the UE's S1 user plane (S1) from the UE's SGW is changed to the target DeNB, and over the optimized bearer path to the MRN. Likewise, the path of the path of UE's S1 control plane ($S1_{MME}$) from the UE's MME is changed to the target DeNB, and over the optimized bearer path to the MRN. The mobile RN can initiate the Path Switch Request procedure through target DeNB to inform the UE's MME/SGW to change the DL endpoint. After the UE's MME/SGW switches the DL path, the DL control and user plane data will be transferred from the UE's MME/SGW to the target DeNB. Thereafter there will be no data sent to the initial DeNB through the old PDN connection with the old RN-IP address, so the initial DeNB can deactivate the bearers in the old PDN connection and release the old IP address.

Data forwarding: Before the path switch of the UE bearer, the DL data coming from the initial DeNB and the data buffered in the source DeNB will be all forwarded to the target DeNB. Meanwhile user data in the uplink will be sent to the target DeNB through the mobile RN. During this period, all the data transferred to, or received from the mobile RN is packaged using the old mobile RN IP. The new mobile RN IP will not be used until the target DeNB has received the Path Switch Request ACK message sent by the MME (UE).

The mobile RN's PGW relocation frequency is an implementation issue and can be determined by the operator. It can be HO-triggered, and executed every time a handover occurs. Or the operator can just relocate the RN's PGW in some locations along the train path (such as major cities), especially when the length of data path cannot be tolerated.

The following references are related to subject matter of the present application. Each of these references is incorporated herein by reference in its entirety: R3-120610: "Path optimization for mobile relay", Nokia Siemens Networks, ZTE, NEC, 3GPP TSG RAN WG3 #75 bis; R3-121118: "Discussion and Comparison on Path optimization for Mobile Relay Alternatives", New Postcom, Institute for Information Industry (III), 3GPP TSG RAN WG3 #76.

Figure 11:
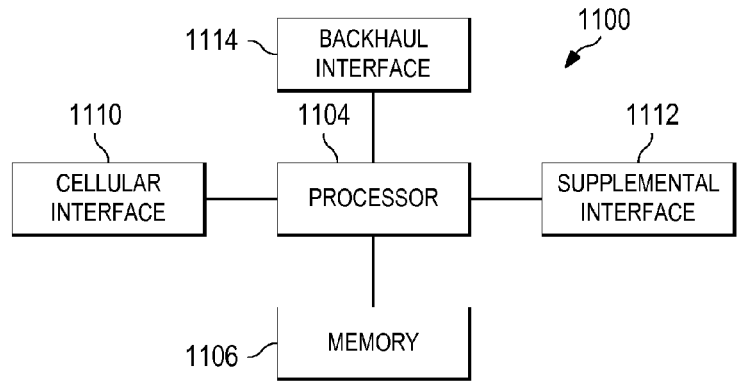
FIG. 11 illustrates a block diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental interface 1112, and a backhaul interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental interface 1112 may be any component or collection of components that allows the communications device 1100 to communicate data or control information via a supplemental protocol. For instance, the supplemental interface 1112 may be a non-cellular wireless interface for communicating in accordance with a Wireless-Fidelity (Wi-Fi) or Bluetooth protocol. Alternatively, the supplemental interface 1112 may be a wireline interface. The backhaul interface 1114 may be optionally included in the communications device 1100, and may comprise any component or collection of components that allows the communications device 1100 to communicate with another device via a backhaul network.

Figure 12:
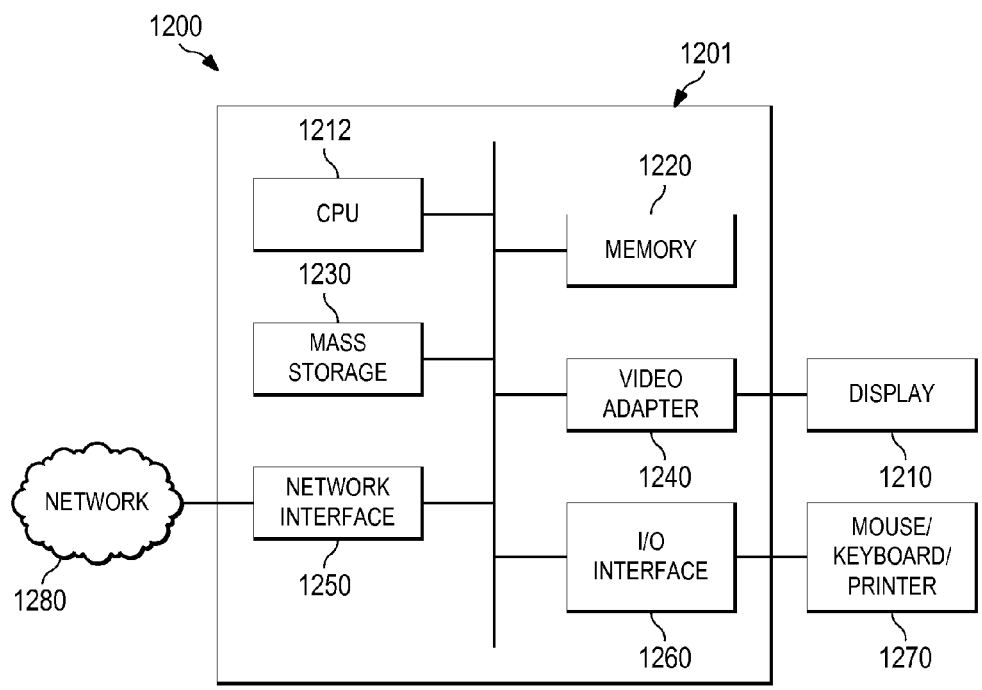
FIG. 12 illustrates a block diagram of an embodiment processing system.

FIG. 12 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for path optimization in mobile relay node architecture, the method comprising:
    coordinating a first transfer of traffic flows from a first bearer path to a second bearer path, the first bearer path passing through both an initial donor enhanced base station (DeNB) and a source DeNB, and the second bearer path passing through both the initial DeNB and a target DeNB, wherein both the first bearer path and the second bearer path extend between a mobile relay node and a core network of a user equipment (UE), and the mobile relay node provides wireless access to the UE;
    coordinating relocation of a packet data network gateway (PGW) function of the mobile relay node from the initial DeNB to the target DeNB based on an internet protocol (IP) address of a PGW in the initial DeNB and an IP address of a PGW in the target DeNB, the relocation of the PGW function of the mobile relay node establishing a third bearer path extending between the core network and the mobile relay node, wherein the third bearer path passes through the target DeNB without passing through the initial DeNB and the source DeNB; and
    coordinating a second transfer of the traffic flows from the second bearer path to the third bearer path, wherein the first bearer path, the second bearer path and the third bearer path carry at least some data that is not control signaling.

2. The method of claim 1, further comprising releasing the first bearer path after transferring the traffic flows to the second bearer path.

3. The method of claim 1, wherein the second bearer path includes a first backhaul interface extending between the target DeNB and the initial DeNB and a second backhaul interface extending between the initial DeNB and the core network of the UE, and
    wherein the third bearer path includes a third backhaul interface extending between the target DeNB and the core network of the UE.

4. The method of claim 1, wherein coordinating the relocation of the PGW function of the mobile relay node from the initial DeNB to the target DeNB comprises:
    sending, by the target DeNB, a path switch request to a mobility management entity (MME) serving the mobile relay node, the path switch request including a packet data network gateway (PGW) relocation information element (IE) that indicates instantiation of a new relay gateway function for the third bearer path at the target DeNB.

5. The method of claim 4, wherein the PGW relocation IE includes an internet protocol (IP) address for a relay node PGW (RN PGW) in the target DeNB.

6. The method of claim 1, wherein coordinating the relocation of the PGW function of the mobile relay node from the initial DeNB to the target DeNB comprises:
    receiving, by the target DeNB, a create session path request from a mobile management entity (MME) of the mobile relay node, wherein the create session path request comprises a PGW relocation information element (IE), and wherein the PGW relocation IE includes internet protocol (IP) addresses for a first relay node PGW (RN PGW) in the target DeNB and a second relay node PGW in the initial DeNB.

7. The method of claim 1, wherein coordinating the second transfer of the traffic flows from the second bearer path to the third bearer path comprises:
receiving, by the target DeNB, an S1 UE context modification request message from a mobile management entity (MME) of the mobile relay node, wherein the S1 UE context modification request message indicates establishment of a packet data network (PDN) session corresponding to the third bearer path;
updating, by the target DeNB, a context for the mobile relay node in accordance with the S1 UE context modification request message; and
binding, by the target DeNB, bearers of the PDN session corresponding to the third bearer path to corresponding radio bearers of an Un interface from the target DeNB to the mobile relay node.

8. The method of claim 1, wherein coordinating the second transfer of the traffic flows from the second bearer path to the third bearer path comprises:
receiving, by the target DeNB, an activate default enhanced packet switch (EPS) bearer context request message from a mobile management entity (MME) of the mobile relay node, wherein the activate default EPS bearer context request message activates the third bearer path.

9. The method of claim 8, further comprising:
forwarding, by the target DeNB, the activate default EPS bearer context request message to the mobile relay node via a radio resource configuration (RRC) connection reconfiguration message.

10. The method of claim 1, wherein coordinating the second transfer of the traffic flows from the second bearer path to the third bearer path comprises:
sending, by the mobile relay node, a path switch request to the target DeNB, the path switch request including a first internet protocol (IP) address assigned to the mobile relay node by the target DeNB, wherein the target DeNB is configured to modify the path switch request by replacing the first IP address assigned to the mobile relay node with a second IP address assigned to the target DeNB, and to forward the modified path switch request to a mobile management entity (MME) of the UE, the path switch request indicating to the MME of the UE to transfer the traffic flows for the UE from the initial DeNB to the target DeNB.

11. The method of claim 1, wherein coordinating the second transfer of the traffic flows from the second bearer path to the third bearer path comprises:
receiving, by the target DeNB, a path switch request from the mobile relay node, the path switch request including a first internet protocol (IP) address assigned to the mobile relay node by the target DeNB;
modifying, by the target DeNB, the path switch request by replacing the first IP address with a second IP address assigned to the target DeNB; and
forwarding, by the target DeNB, the modified path switch request to a mobile management entity (MME) serving the UE, the modified path switch request prompting the MME to transfer the traffic flows from the second bearer path to the third bearer path.

12. The method of claim 11, wherein coordinating the second transfer of the traffic flows from the second bearer path to the third bearer path further comprises:
receiving, by the target DeNB, a path switch acknowledgement message from the MME, the path switch acknowledgment message acknowledging that the traffic flows have been transferred from the second bearer path to the third bearer path.

13. An apparatus comprising:
a processor; and
a computer readable storage medium storing programming for execution by the processor, the programming including instructions to:
coordinate a first transfer of traffic flows from a first bearer path to a second bearer path, the first bearer path passing through both an initial donor enhanced base station (DeNB) and a source DeNB and the second bearer path passing through both the initial DeNB and a target DeNB, wherein both the first bearer path and the second bearer path extend between a mobile relay node and a core network of a user equipment (UE), and wherein the mobile relay node provides wireless access to the UE;
coordinate relocation of a packet data network gateway (PGW) function of the mobile relay node from the initial DeNB to the target DeNB based on an internet protocol (IP) address of a PGW in the initial DeNB and an IP address of a PGW in the target DeNB, the relocation of the PGW function of the mobile relay node establishing a third bearer path extending between the core network and the mobile relay node, wherein the third bearer path passes through the target DeNB without passing through the initial DeNB and the source DeNB; and
coordinate a second transfer of the traffic flows from the second bearer path to the third bearer path, wherein the first bearer path, the second bearer path and the third bearer path carry at least some data that is not control signaling.

14. The apparatus of claim 13, wherein the apparatus comprises the mobile relay node.

15. The apparatus of claim 13, wherein the apparatus comprises the target DeNB.

16. The apparatus of claim 13, wherein the apparatus comprises a mobile management entity (MME) in the core network of the UE.

17. A method for path optimization in a mobile relay node architecture, the method comprising:
receiving, by a mobile management entity (MME) serving a mobile relay node, a path switch request message for initiating a path optimization of a bearer channel carrying traffic between a core network and a user equipment (UE) after the traffic between the core network and the UE was transferred from a first bearer path to a second bearer path, wherein the mobile relay node provides wireless access to the UE, and wherein the bearer channel extends over the second bearer path prior to optimization, the first bearer path passing through both an initial donor enhanced base station (DeNB) and a source DeNB, and the second bearer path passing through the initial DeNB and a target DeNB, wherein both the first bearer path and the second bearer path extend between the mobile relay node and the core network;
sending, by the MME, a create session path request to the target DeNB, the create session path request initiating relocation of a packet data network gateway (PGW) function of the mobile relay node from the initial DeNB to the target DeNB based on an internet protocol (IP) IP address of a PGW in the initial DeNB and an IP address of a PGW in the target DeNB, wherein the relocation of the PGW function establishes a third bearer path that passes through the target DeNB without passing through the initial DeNB and the source DeNB, and wherein the third bearer path extends between the mobile relay node and the core network; and sending, by the MME, an activate default enhanced packet switch (EPS) bearer context request message to the target DeNB, the activate default EPS bearer context request message coordinating a transfer of the bearer channel from the second bearer path to the third bearer path, wherein the first bearer path, the second bearer path and the third bearer path carry at least some data that is not control signaling.

18. The method of claim 17, wherein the path switch message request includes a packet data network gateway (PGW) relocation information element (IE) indicating that a new relay gateway function for the third bearer path is being instantiated at the target DeNB.

19. The method of claim 17, wherein the path switch request message comprises a packet data network gateway (PGW) relocation information element (IE) that includes internet protocol (IP) addresses for a first relay node PGW (RN PGW) in the target DeNB and a second relay node PGW in the initial DeNB.

20. The method of claim 17, further comprising:
sending, by the MME, an S1 UE context modification request message to the target DeNB, wherein the S1 UE context modification request message updates a context for the mobile relay node at the target DeNB.

21. A mobile management entity (MME) serving a mobile relay node, the MME comprising:
a processor; and
a computer readable storage medium storing programming for execution by the processor, the programming including instructions to:
receive a path switch request message for initiating a path optimization of a bearer channel carrying traffic between a core network and a user equipment (UE) after the traffic between the core network and the UE was transferred from a first bearer path to a second bearer path, wherein the mobile relay node provides wireless access to the UE, and wherein the bearer channel extends over the second bearer path prior to optimization, the first bearer path passing through both an initial donor enhanced base station (DeNB) and a source DeNB, and the second bearer path passing through the initial DeNB and a target DeNB, wherein both the first bearer path and the second bearer path extend between the mobile relay node and the core network;
send a create session path request to the target DeNB, the create session path request initiating relocation of a packet data network gateway (PGW) function of the mobile relay node from the initial DeNB to the target DeNB based on an internet protocol (IP) address of a PGW in the initial DeNB and an IP address of a PGW in the target DeNB, wherein the relocation establishes a third bearer path that passes through the target DeNB without passing through the initial DeNB and the source DeNB, and wherein the third bearer path extends between the mobile relay node and the core network; and
send an activate default enhanced packet switch (EPS) bearer context request message to the target DeNB, the activate default EPS bearer context request message coordinating a transfer of the bearer channel from the second bearer path to the third bearer path, wherein the first bearer path, the second bearer path, and the third bearer path carry at least some data that is not control signaling.

* * * * *